US008383539B2

(12) United States Patent
Sumida et al.

(10) Patent No.: US 8,383,539 B2
(45) Date of Patent: Feb. 26, 2013

(54) FIBER MANUFACTURING METHOD, FIBER MANUFACTURING APPARATUS AND PROTON-EXCHANGE MEMBRANE FUEL CELL

(75) Inventors: Hiroto Sumida, Nara (JP); Takahiro Kurokawa, Osaka (JP); Kazunori Ishikawa, Osaka (JP); Yoshiaki Tominaga, Kanagawa (JP); Mikio Takezawa, Tokyo (JP); Mitsuhiro Takahashi, Ehime (JP); Takatoshi Mitsushima, Nara (JP)

(73) Assignee: Panasonic Corporation, Osaka (JP)

(*) Notice: Subject to any disclaimer, the term of this patent is extended or adjusted under 35 U.S.C. 154(b) by 267 days.

(21) Appl. No.: 12/921,847

(22) PCT Filed: Mar. 9, 2009

(86) PCT No.: PCT/JP2009/001050

§ 371 (c)(1), (2), (4) Date: Sep. 10, 2010

(87) PCT Pub. No.: WO2009/113290
PCT Pub. Date: Sep. 17, 2009

(65) Prior Publication Data
US 2011/0014542 A1 Jan. 20, 2011

(30) Foreign Application Priority Data

Mar. 12, 2008 (JP) ................................ 2008-063190
Aug. 19, 2008 (JP) ................................ 2008-211218

(51) Int. Cl.
*H01M 4/88* (2006.01)

(52) U.S. Cl. ......................... 502/101; 429/532; 264/465

(58) Field of Classification Search .................. 429/530, 429/532; 264/465; 502/101
See application file for complete search history.

(56) References Cited

U.S. PATENT DOCUMENTS (Continued)

FOREIGN PATENT DOCUMENTS

| | | |
|---|---|---|
| JP | 61-012920 | 1/1986 |
| JP | 2004-518795 | 6/2004 |

(Continued)

OTHER PUBLICATIONS

International Search Report issued Jun. 24, 2009 in International (PCT) Application No. PCT/JP2009/001050.

(Continued)

*Primary Examiner* — Stephen J. Kalafut
(74) *Attorney, Agent, or Firm* — Wenderoth, Lind & Ponack, LLP.

(57) ABSTRACT

A carried material is carried only on a surface of nano-fibers. It includes a raw material liquid spray step that sprays raw material liquid, which is a raw material of nano-fibers, into a space, a raw material liquid electrically charging step, which applies an electric charge to the raw material liquid and makes the raw material liquid electrically charged, a nano-fiber manufacturing step that manufactures the nano-fibers by having the electrically charged and sprayed raw material liquid explode electrostatically, a carried material electrically charging step that electrically charges a carried material carried on the nano-fibers with a polarity opposite to a polarity of the electrically charged nano-fibers, and a mixing step that mixes the manufactured nano-fibers and the electrically charged carried material in a space.

12 Claims, 8 Drawing Sheets

U.S. PATENT DOCUMENTS

| | | | |
|---|---|---|---|
| 5,992,008 A * | 11/1999 | Kindler | 429/530 X |
| 8,124,260 B2 | 2/2012 | Sayre et al. | |
| 2002/0150678 A1 | 10/2002 | Cramer et al. | |
| 2002/0151634 A1 | 10/2002 | Rohrbaugh et al. | |
| 2002/0160159 A1 | 10/2002 | McDonald et al. | |
| 2002/0192366 A1 | 12/2002 | Cramer et al. | |
| 2004/0052957 A1 | 3/2004 | Cramer et al. | |
| 2004/0138352 A1* | 7/2004 | Taniguchi et al. | 524/115 |
| 2004/0158212 A1 | 8/2004 | Ponomarenko et al. | |
| 2004/0158213 A1 | 8/2004 | Ponomarenko et al. | |
| 2004/0158214 A1 | 8/2004 | Ponomarenko et al. | |
| 2005/0287366 A1 | 12/2005 | Okuzaki et al. | |
| 2006/0019819 A1 | 1/2006 | Shao-Horn et al. | |
| 2006/0247587 A1 | 11/2006 | Ponomarenko et al. | |
| 2006/0253092 A1 | 11/2006 | Ponomarenko et al. | |
| 2006/0258999 A1 | 11/2006 | Ponomarenko et al. | |
| 2006/0290031 A1 | 12/2006 | Jirsak et al. | |
| 2007/0218281 A1 | 9/2007 | Demir et al. | |
| 2007/0231470 A1 | 10/2007 | Koyama et al. | |
| 2008/0248362 A1 | 10/2008 | Sayre et al. | |
| 2012/0276470 A1 | 11/2012 | Sayre et al. | |

FOREIGN PATENT DOCUMENTS

| | | |
|---|---|---|
| JP | 2005-264374 | 9/2005 |
| JP | 2005-330624 | 12/2005 |
| JP | 2006-313706 | 11/2006 |
| JP | 2007-505224 | 3/2007 |
| JP | 2007-214008 | 8/2007 |
| JP | 2007-220416 | 8/2007 |
| JP | 2007-273190 | 10/2007 |
| JP | 2008-521174 | 6/2008 |
| JP | 2009-026698 | 2/2009 |
| WO | 02/064877 | 8/2002 |
| WO | 2005/021845 | 3/2005 |
| WO | 2005/024101 | 3/2005 |
| WO | 2006/055652 | 5/2006 |

OTHER PUBLICATIONS

Written Opinion of the International Searching Authority issued Jun. 24, 2009 in International (PCT) Application No. PCT/JP2009/001050.

Olga A. et. al., "Characterization of Proton Exchange Membrane Fuel Cells with Catalyst Layers Obtained by Electrospraying", Electrochemical and Solid-State Letters, 8(6) A267-A269, 2005.

* cited by examiner

FIBER MANUFACTURING METHOD, FIBER MANUFACTURING APPARATUS AND PROTON-EXCHANGE MEMBRANE FUEL CELL

BACKGROUND OF THE INVENTION

1. Technical Field

The present invention relates to a fiber manufacturing apparatus that manufactures fibers by using an electrospinning method (an electrostatic stretching phenomenon), and especially relates to a fiber manufacturing method and a fiber manufacturing apparatus that can add various types of functions to fine fibers of which diameter is in a nano order (nano-fibers).

Moreover, the present invention relates to a fiber manufacturing method for manufacturing fibers that make up a catalyst substance layer used as a fuel electrode or an oxygen electrode for a proton-exchange membrane fuel cell.

2. Background Art

Conventionally, an electrospinning (an electrostatic stretching phenomenon) method is known as a method for manufacturing filamentous (fibrous form) substances (nano-fibers) made of polymeric substances and having a diameter in a submicron scale.

In the electrospinning method, raw material liquid in which polymeric substances and such are dispersed or dissolved in a solvent medium is injected (outpoured) to a space, through a nozzle or such, while the raw material liquid is charged by applying an electric charge and the raw material liquid that flies in the space is electrostatistically exploded, so that nano-fibers can be obtained.

More specifically, regarding the raw material liquid that is electrically charged and outpoured, as the solvent medium is evaporated from the raw material liquid flying in the space, volume of the raw material liquid decreases. On the other hand, the electric charge applied to the raw material liquid remains in the raw material liquid. As a result, a particle of the raw material liquid flying in the space is made to a higher electric charge density. Moreover, because the solvent medium in the raw material liquid keeps evaporating on an ongoing basis, the electric charge density of the raw material liquid is further increased, and the polymer solution undergoes a phenomenon (an electrostatic stretching phenomenon) in which the polymer solution is explosively stretched into filament at a point when coulomb force acting oppositely generated in the raw material liquid exceeds the surface tension power of the raw material liquid. Because this electrostatic stretching phenomenon occurs one after another at an exponential rate in the space, fibers (nano-fibers) made of polymeric substances of which diameter is in a submicron scale (for example, see Japanese Unexamined Patent Application Publication No. 2005-330624) is manufactured.

The fibers manufactured by the above electrospinning method are used as a raw material for a string or a nonwoven fabric cloth. Additionally, there has been an attempt to improve functionality of the string or the nonwoven fabric cloth by having the nano-fibers carry functional substances such as a catalyst or an absorbent substance.

For example, an applicant of the present invention has filed a manufacturing method of nano-fibers carrying a carried material through manufacturing such nano-fibers by pre-mixing a functional carried material into raw material liquid and manufacturing nano-fibers from the concerned raw material liquid through the electrospinning method.

In addition, a power fuel cell has been drawing attention in recent years. The reason for that is as follows. Namely, the fuel cell, contrary to its name, is not like a battery that electrically discharges pre-charged power such as a primary cell like a dry-cell battery or a secondary cell like a lead acid battery. It is something closer to a power generation apparatus that allows us to take out the power on an on-going basis if a fuel such as hydrogen and an oxidizing agent such as oxygen are supplied continuously. The fuel cell is not like a conventional power generation apparatus that uses a thermal engine and it allows for obtaining of electric energy directly from chemical energy without going through motion energy, so that it has a high power generation efficiency with less noise and less vibration. Therefore, it is expected to be used as a power source of a portable apparatus, a power source for domestic use or a power source of automobiles, trains and so on.

The following actions are taken as a method to generate power by the fuel cell. In short, in a catalyst substance layer of a fuel electrode, hydrogen is divided into an electron and a proton (a hydrogen ion) by using a catalyst substance. The divided electron is supplied to the outside of the fuel cell via an electric conductor. The proton is moved to an oxygen electrode via a proton conductive polymer within the fuel cell. The proton going through the proton conductive polymer reacts with oxygen in the solvent layer of the oxygen electrode and turns into water, but because it requires an electron at this point, the electron conveyed to the outside of the fuel cell is collected and provided for the aforementioned reaction.

Consequently, a difference in an electric potential is created between the fuel electrode, which has an excessive amount of electrons, and the oxygen electrode, which requires more electrons, and the power can be generated.

As described above, in order for hydrogen to be divided into an electron and a proton in the catalyst substance layer of the fuel electrode, and for the proton, oxygen and the electron to react and turn into water in the catalyst substance layer of the oxygen electrode, it is necessary that the oxygen makes contacts with the catalyst substance, and that the proton, the oxygen and the electron make contacts among themselves. Moreover, in order to move the electron, it is necessary to have an electric conductor close to the aforementioned catalyst substance. In order to move the proton, it is necessary to have a proton conductive polymer close to the catalyst substance.

Furthermore, for improving a power generation efficiency of the fuel cell, it is necessary to be the location where the catalyst substance, the electric conductor and the proton conductive polymer all coexist. In the catalyst substance layer of the fuel electrode, it is necessary to have many locations with a high probability for making contacts with hydrogen, and in the catalyst substance layer of the oxygen electrode, it is necessary to have many locations with a high probability for making contacts with oxygen.

Conventionally, the following method has been proposed to form the catalyst substance layer as described above (see Japanese Unexamined Patent Application Publication No. 2007-214008). In short, a carbon carrying a catalyst substance and a proton conductive polymer are put in the solvent medium and made into a liquid form. The concerned liquid is injected from one electrode to another electrode to which high voltage is applied. As described above, an electrostatic stretching phenomenon is created, and fibers made of the proton conductive polymer that carries the catalyst substance and the carbon are manufactured. A porous catalyst substance layer is formed by depositing the concerned fibers.

However, as an inventor of the present invention further researched the aforementioned fiber manufacturing method, the inventor discovered there is a case that fibers having a desired function are difficult to manufacture depending on a type of a resin consisting of fibers or a type of a carried material to be carried. As the inventor was dedicated to doing further research, the inventor discovered there is a case that the carried material cannot perform its function because the carried material is contained within the fibers, and there is a case that a mechanical strength of the fibers is weakened because the carried material is intruded into the fibers too much.

Also, for the fuel cell, in the aforementioned method, the catalyst substance is built in the proton conductive polymer in a process the proton conductive polymer is turned into fibers so that there are so many catalyst substances that do not make contacts with hydrogen or oxygen and are not provided for reaction necessary for power generation. The fuel cell containing such a catalyst substance layer does not have a good power generation efficiency as it is compared to an amount of the catalyst substance used.

SUMMARY OF THE INVENTION

The present invention is conceived in view of the above problems, and it is an object to provide a manufacturing method and a manufacturing apparatus of fibers preventing degradation of a mechanical strength of the fibers themselves as well as performing a full range of functions of the carried material.

Furthermore, in view of the above problems, it is another object of the present invention to provide a catalyst substance layer manufacturing method for a fuel cell and a fiber manufacturing apparatus that can carry an exposed catalyst substance in an efficient manner and manufacture a catalyst substance layer consisting of a proton conductive polymer where an electric conductor is laid out close to the catalyst substance.

In order to achieve above objects, a fiber manufacturing method according to the present invention is a fiber manufacturing method including: a first outpouring step of outpouring a first raw material as a material of fibers into a space; a first electrically charging step of applying an electric charge to the first raw material and making the first raw material electrically charged; a fiber manufacturing step of manufacturing fibers made of the electrically charged and outpoured first raw material by having the first raw material stretch; a secondary electrically charging step of electrically charging a secondary raw material including a carried material to be carried on the fibers with a polarity opposite to a polarity of the electrically charged fibers; and a mixing step of mixing the manufactured fibers and the electrically charged carried material in the space.

By doing this, the manufactured fibers and the carried material are mixed in specific space. Additionally, because the fibers and the carried material are electrically charged with a polarity opposite to each other, the carried material is adhered on the surface of the fibers. Therefore, it is possible to assign a new function to the carried material while an impact on a mechanical function of the fibers is retrained. Besides, because the carried material exist only on the surface of the fibers, it is possible to manufacture the fibers that can encourage the carried material to perform its full function without ruining the function of the carried material.

It is preferable to include a conveying step of conveying the manufactured fibers by a gas flow, in which, in the mixing step, the fibers in the conveying step and the carried material are mixed.

According to this, since the carried material is mixed with the fibers conveyed by the gas flow in a dispersed form, it is possible to have the carried material be carried evenly in the whole space and also evenly for the fibers. Consequently, it makes it possible to manufacture the fibers that allow the carried material to perform the function in a stable manner.

Moreover, it may include a collection step of separating the fibers carrying the carried material from the gas flow, and depositing and collecting the fibers.

Along with this, it makes it possible to efficiently collect the fibers that evenly carry the carried material, and supply the collected fibers for manufacturing a nonwoven fabric cloth or fiber spinning.

In addition in order to achieve the above object, a fiber manufacturing apparatus according to the present invention is a fiber manufacturing apparatus including: a first outpouring apparatus which outpours a first raw material as a material of fibers into a space; an electrically charging apparatus which applies an electric charge to the first raw material and makes the first raw material electrically charged; a first gas flow generation apparatus which generates a gas flow for conveying the fibers; a secondary electrically charging apparatus which electrically charges a secondary raw material including a carried material to be carried on the fibers with a polarity opposite to a polarity of the fibers electrically charged; and a mixing apparatus which mixes the manufactured fibers and the electrically charged carried material. By doing this, the manufactured fibers and the carried material can be mixed in a specific space. Additionally, because the fibers and the carried material can be electrically charged with a polarity opposite to each other, the carried material can be adhered on the surface of the fibers. Therefore, it is possible to assign a new function to the carried material while an impact on a mechanical function of the fibers is retrained. Besides, because the carried material exist only on the surface of the fibers, it is possible to manufacture the fibers that can encourage the carried material to perform its full function without ruining the function of the carried material.

In order to achieve the above secondary object, the fiber manufacturing method according to the present invention, in which the first raw material includes a proton conductive polymer and a volatile solvent medium, the secondary raw material includes a catalyst substance as a carried material, and in the fiber manufacturing step, fibers made of the proton conductive polymer are manufactured, and the fiber manufacturing method further includes: a third electrically charging step of applying an electric charge to a third raw material including an electric conductor and making the third raw material electrically charged; a third outpouring step of outpouring the third raw material into a space; a mixing step of mixing the fibers, the catalyst substance and the electric conductor in the space; and a deposit step of depositing the fibers, the electric conductor and the catalyst substance on a substrate.

According to this, since the catalyst and the electric conductor are adhered and combined with the surface of the fibers made up of the proton conductive polymer, an amount of the catalyst incorporated in the proton conductive polymer can be decreased as much as possible. Also, because the fibers, the catalyst, and the electric conductor are combined in the space, it is easier to obtain a three-dimensional structure, which increases an area of the catalyst exposed on the surface of the fibers made up of the proton conductive polymer.

In addition, because the electric conductor is combined with the surface of the fibers like the catalyst, it is possible to form a large amount of areas where the proton conductive polymer, the catalyst and the electric conductor are located close to each other. Moreover, as the fibers made up of the proton conductive polymer are manufactured through an electrostatic stretching phenomenon, fibers, each of which diameter is a submicron, are manufactured. Besides, the catalyst substance layer is formed by accumulation of the concerned fiber, the catalyst substance layer becomes porous that allows a large amount of hydrogen, oxygen or such to get through.

Therefore, the fuel cell including the concerned catalyst substance layer can gain a high power generation efficiency against an amount of the catalyst poured in.

It is preferable that, in the secondary electrically charging step and the third electrically charging step, a polarity of an electric charge applied to the catalyst substance and a polarity of an electric charge applied to the electric conductor are adjusted to be different from each other, and in the mixing step, a carried material including a combination of the electric conductor and the catalyst substance is formed by mixing the catalyst substance and the electric conductor, and the fibers and the carried material are combined by mixing the fibers and a carried substance.

According to this, it makes it possible to make sure the catalyst, of which amount is relatively smaller than an amount of the proton conductive polymer, is combined with the electric conductor to form the carried material, and further allocate a large amount of an area where the proton conductive polymer, the catalyst and the electric conductor are located close to each other within the catalyst substance layer to combine the concerned carried material and the proton conductive polymer.

It is preferable that, in the first electrically charging step, the third electrically charging step and the secondary electrically charging step, an amount of the electric charge and a polarity applied to the first raw material, the secondary raw material and the third raw material are adjusted to electrically charge the formed carried material with a polarity opposite to a polarity of an electric charge applied to the fibers in the mixing step.

By doing this, it becomes possible to combine the proton conductive polymer with the carried material at a high probability, and to manufacture a catalyst substance layer having a high performance.

ADVANTAGEOUS EFFECTS

According to the present invention, because the carried material can be carried only on the surface of the fibers that are manufactured or being manufactured, it is possible to provide fibers that allow a full range of functions of the carried material to be performed while it restrains degradation of a mechanical strength of the fibers themselves.

Also, according to the present invention, it is possible to manufacture a porous catalyst substance layer, which has interconnecting cells allowing hydrogen, oxygen or such to go through easily, and allows a proton and oxygen to react with high efficiency.

FURTHER INFORMATION ABOUT TECHNICAL BACKGROUND TO THIS APPLICATION

The disclosure of Japanese Patent Application No. 2008-063190 filed on Mar. 12, 2008 and the disclosure of Japanese Patent Application No. 2008-211218 filed on Aug. 19, 2008 each including specification, drawings and claims is incorporated herein by reference in their entirety.

DETAILED DESCRIPTION OF THE INVENTION

Next, embodiments of the fiber manufacturing apparatus according to the present invention shall be explained with reference to the drawings.

Embodiment 1

Figure 1:
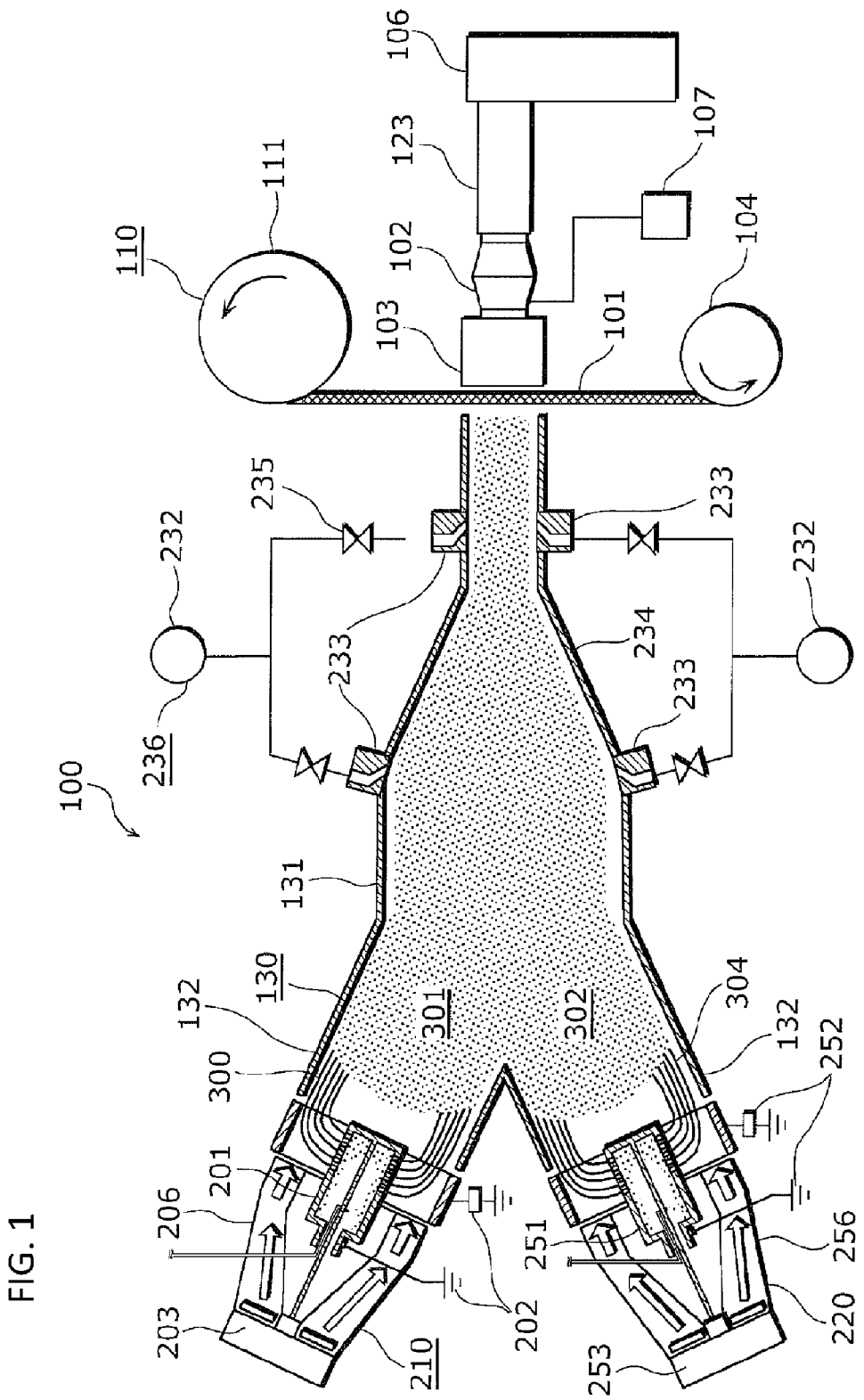
FIG. 1 is a cross-section view that schematically shows a fiber manufacturing apparatus in an embodiment according to the present invention.

FIG. 1 is a cross-section view that schematically shows a fiber manufacturing apparatus in the embodiment according to the present invention.

As shown in the drawings, the fiber manufacturing apparatus 100 is an apparatus that mixes fibers 301 discharged from a discharge apparatus 210, a secondary raw material 304 including a carried material 302 discharged from a secondary discharge apparatus 220, or a carried material 302 in a space, and has the carried material 302 be carried on a surface of the fibers 301. The discharge apparatus 210 includes an outpouring apparatus 201, an electrically charging apparatus 202, a blower tube 206 and a gas flow generation apparatus 203. On the other hand, the secondary discharge apparatus 220 includes a secondary outpouring apparatus 251, a secondary electrically charging apparatus 252, a secondary blower tube 256 and a secondary gas flow generation apparatus 253. Moreover, the fiber manufacturing apparatus 100 includes a mix apparatus 130, an accelerator 236 and a collection apparatus 110.

The discharge apparatus 210 is a unit that can discharge and put the fibers 301, which are manufactured through an electrostatic stretching phenomenon, on a gas flow while a raw material 300 electrically charged or the raw material 300 concerned is flying. Details of the discharge apparatus 210 shall be explained later.

Here, a raw material for manufacturing fibers is described as the raw material 300, and fibers manufactured are described as the fibers 301. However, in a manufacturing process, the raw material 300 is transformed into the fibers 301 as it stretches so that a borderline between the raw material 300 and the fibers 301 is vague and it is not something that can be distinctive clearly.

The mix apparatus 130 is a tubular member that mixes the fibers 301 (the raw material 300) discharged from the discharge apparatus 210 and the carried material 302 (the secondary raw material 304) discharged from the secondary discharge apparatus 220 with a gas flow. The mix apparatus 130 is a tubular member, which is connected in a Y shape, so that the fibers 301 and the carried material 302, which are respectively generated at different locations, are guided to converge at one location and these confluent fibers 301 and carried material 302 are mixed. The mix apparatus 130 has a structure that two pieces of a sub cylindrical body 132 having a small diameter are connected in a row from an edge of a main cylindrical body 131 having a big diameter, and these two pieces of the sub cylindrical body 132 are facing to an opposite direction.

In the present embodiment, a pipe in a circular cylinder form is used for the main cylindrical body 131 and the sub cylindrical body 132, but a shape of the mix apparatus 130 is arbitrary so that a tube having a rectangular cross-section surface or such may be used. Also, the mix apparatus 130 is not limited only to the tubular member connected in a Y shape. It may be a tubular member connected in a T shape as long as it can guide the fibers 301 and the carried material 302 to converge at one location.

The collection apparatus 110 is an apparatus that collects the fibers 301 on which surface the carried material 302 is adhered, and that includes a substrate 101, a conveying apparatus 104, a vacuum apparatus 102, the vacuum control apparatus 107 and an area restriction unit 103.

The substrate 101 is a substrate where the fibers 301, which are manufactured and fly through an electrostatic stretching phenomenon, are deposited on. The substrate 101 is a substrate that separates the fibers 301, which are guided by a gas flow, from the gas flow and collects it, and that has many microscopic holes, which allows the gas flow to go through but does not allow the fibers 301 to go through. In the present embodiment, the substrate 101 is a thin, flexible and long sheet type substrate consisting of a material, which can be easily separated from the fibers 301. To be more specific, it is possible to illustrate it by a long net made of aramid fibers as an example of the substrate 101. In addition, it is preferable to apply Teflon (trademark registration) coating on the surface of the substrate 101 because it improves detachability when the deposited fibers 301 are detached from the substrate 101. Also, the substrate 101 is supposed to be rolled up in a roll form and fed from a supply roll 111.

The conveying apparatus 104 draws out the long substrate 101 as it rolls up from the supply roll 111, and slowly moves it to an area close to a derivation opening of the accelerator 236, and conveys the substrate 101 with the deposited fibers 301. The conveying apparatus 104 is an apparatus that can roll up a nonwoven fabric cloth where the fibers 301 are deposited on together with the substrate 101.

The vacuum apparatus 102 is an apparatus that is located at an opposite side to a side where the fibers 301 of the substrate 101 are deposited on, or in other words, located at an opposite side to a side where the accelerator 236 is located, and that forces the gas flow flowing from the discharge apparatus 210 via the accelerator 236 to go through the substrate 101 and vacuums it. In the present embodiment, a fan such as a sirocco fan or an axial flow fan is chosen as the vacuum apparatus 102, and generates a gas flow that flows from the area restriction unit 103 to a duct 123. Also, the vacuum apparatus 102 is located in a way it is connected to the duct 123, which vacuums most of the gas flow that is provided from the accelerator 236 and mixed with the solvent medium evaporated from the raw material 300, and conveys it to a solvent retrieving apparatus 106 via the duct 123.

The vacuum control apparatus 107 is an apparatus that is connected electrically with the vacuum apparatus 102 and controls a vacuuming volume of the vacuum apparatus 102. In the present embodiment, an air blower is used as the vacuum apparatus 102, the vacuum control apparatus 107 controls a vacuuming volume of a gas by controlling a number of rotations of the aforementioned air blower.

The area restriction unit 103 is a tube which has a function to restrict a vacuuming area of the vacuum apparatus 102, is located at a side opposite to a location where the fibers 301 of the substrate 101 are collected, and is open at its both ends and located between the substrate 101 and the vacuum apparatus 102. It is preferable that a configuration of the area restriction unit 103 corresponds to a configuration of the end part where the fibers 301 are discharged. In a case of the present embodiment, because the configuration of the derivation end opening part of the accelerator 236 is a rectangular, a rectangular tube that corresponds to the aforementioned configuration is used also for the area restriction unit 103. If the aforementioned derivation end part has a circular shape, the area restriction unit 103 may also be a cylindrical shape.

The accelerator 236 is an apparatus, which increases a flying speed of the fibers 301 that are mixed with the carried material 302 by the mix apparatus 130 and carry the carried material 302 on their surface and includes the acceleration flow generation unit 232 and the acceleration air tunnel 234.

The acceleration air tunnel 234 is a tube type member, which is connected to the main cylindrical body 131 of the mix apparatus 130, has a function to guide the fibers 301 discharged from the mix apparatus 130 to the substrate 101, and includes a gas flow feeding entrance 233 on its surrounding wall which can guide the gas flow generated by the acceleration flow generation unit 232 to the inside of the acceleration air tunnel 234. An area connected to the mix apparatus 130 of the acceleration air tunnel 234 consists of an area corresponding to an area of an end part at the derivation side of the mix apparatus 130, and an area of an end part at the derivation side of the acceleration air tunnel 234 is smaller than the area of the aforementioned end part at the derivation side. Therefore, as an overall, the acceleration air tunnel 234 is a funnel shape, which has a shape that can compresses the fibers 301 introduced into the acceleration air tunnel 234 together with the gas flow.

The acceleration flow generation unit 232 is an apparatus that generates a gas flow by introducing a high pressure gas into the acceleration air tunnel 234. In the present embodiment, an apparatus includes a tank (bottle) that can preserve the high pressure gas and a gas derivation unit having a valve 235 for adjusting a pressure of the high pressure gas in the tank.

The gas supplied by the acceleration flow generation unit 232 may be just air, but it is more preferable to have a safety gas of which oxygen containing ratio is lower than the one of the air. It is for preventing an explosion by the solvent medium evaporated from the raw material 300. As to the safety gas, a low oxygen density gas of which oxygen is removed from the air to some extent through a plastic film (a hollow filament film) or superheated steam may be considered. However, this description does not exclude use of a high-purity gas, which rarely contains oxygen, and it also allows using high-purity nitrogen filled into a tank when it is in a form of liquid or gas, or carbon dioxide supplied from dry ice.

Moreover, it is possible to have a heater that heats up the gas flow generated from the acceleration flow generation unit 232.

Figure 2:
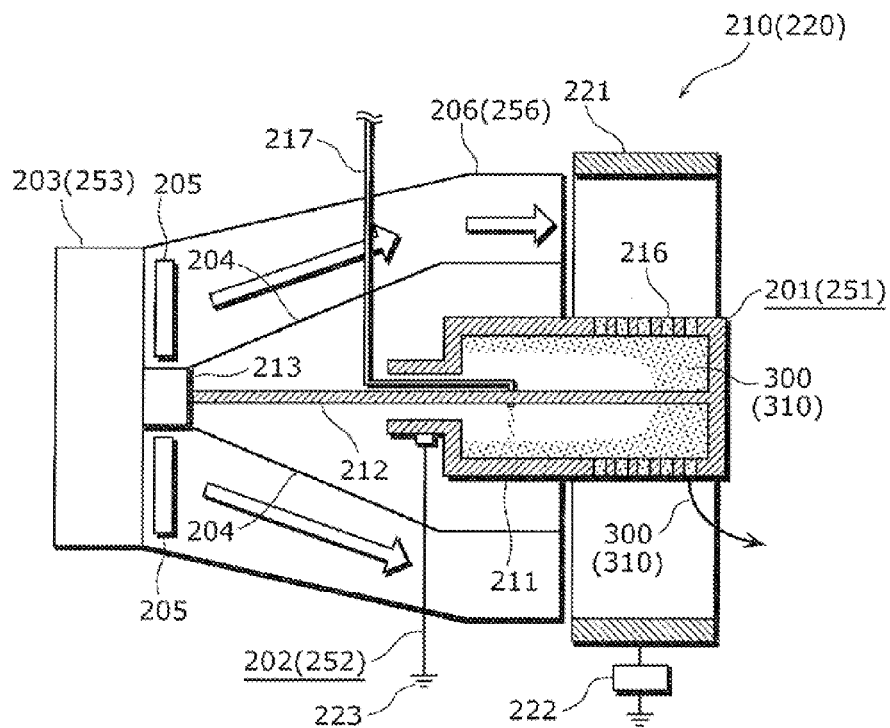
FIG. 2 is a cross-section view that shows an injection apparatus and a secondary injection apparatus.

FIG. 2 is a cross-section view that shows the discharge apparatus and the secondary discharge apparatus.

Figure 3:
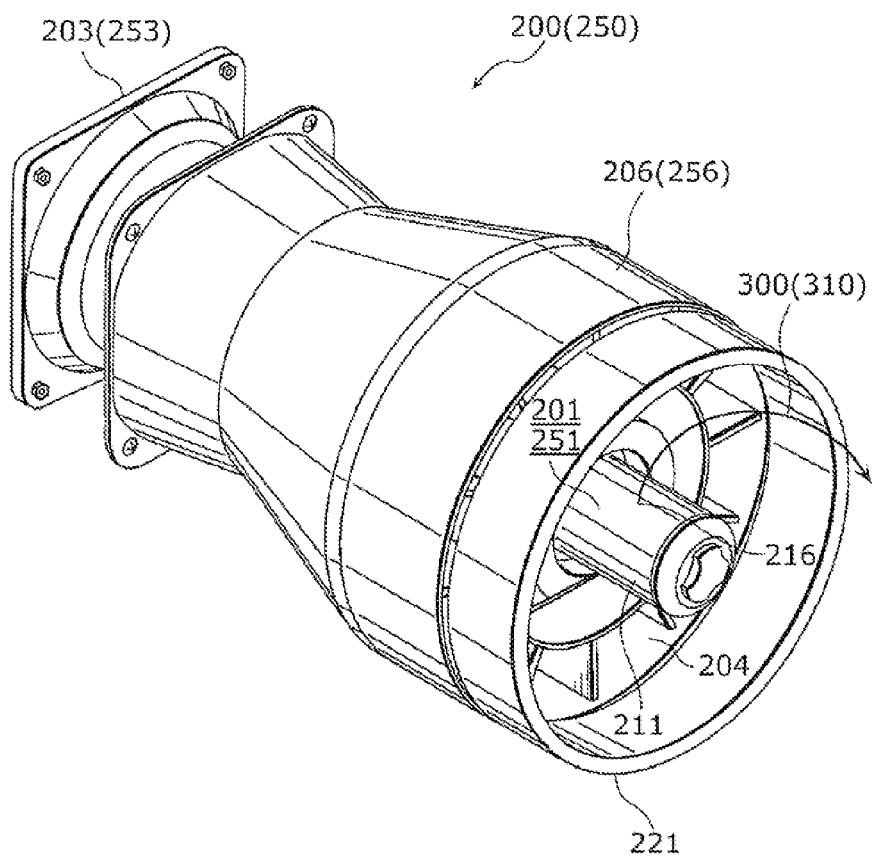
FIG. 3 is a perspective view that shows an injection apparatus and a secondary injection apparatus.

FIG. 3 is a perspective view that shows the discharge apparatus and the secondary discharge apparatus.

As indicated in these diagrams, the discharge apparatus 210 includes the outpouring apparatus 201, the electrically charging apparatus 202, the gas flow generation apparatus 203 and the blower tube 206.

The outpouring apparatus 201 is an apparatus that discharges the raw material 300 in to a space, and is an apparatus that discharges the raw material 300 in a radial pattern through a centrifugal force in the present embodiment. The outpouring apparatus 201 includes a container 211, an axial body 212 and a motor 213.

The container 211 is a container, which allows the raw material 300 to be outpoured into the space through the centrifugal force generated by rotations of itself as the raw material 300 is injected into the inside of the container 211, is a cylindrical shape of which one end is closed, and has many outpouring holes 216 on its surrounding wall. The container 211 is formed of an electric conductor to apply an electric charge to the raw material 300 reserved. The container 211 is supported by a bearing (not shown) located at a supporting structure (not shown), which makes it possible to rotate.

To be more specific, it is appropriate if a diameter of the container 211 is chosen to be something in a range from 10 mm to 300 mm. Because if it is too big, it becomes difficult to centralize the raw material 300 or the fibers 301 with a gas flow. On the other hand, if it is too small, it becomes necessary to increase the number of rotations to outpour the raw material 300 through a centrifugal force, which may cause a problem of generating extra loads or vibrations of the motor. In addition, it is preferable that a diameter of the container 211 is chosen to be something in a range from 20 mm to 100 mm. Also, it is preferable that a shape of an outpouring hole 216 is a circle, and it is appropriate that its diameter is selected to be something in a range from 0.01 mm to 3 mm.

The axial body 212 is an axial body that rotates the container 211 and conveys a driving power to outpour the raw material 300 through a centrifugal force, and is a stick type body that is inserted from other end of the container 211 to the inside of the container 211, and of which one end is connected with an occluded part of the container 211. Also, the other end is connected with a rotation axis of the motor 213.

The motor 213 is an apparatus that applies a rotation driving power to the container 211 via the axial body 212 for outpouring the raw material 300 from the outpouring hole 216 with a centrifugal force. It is preferable that the number of rotations for the container 211 is selected to be something in a range from a few rpm to 10000 rpm depending on an opening diameter of the outpouring hole 216, viscosity of the raw material 300 and a type of polymeric substances within the raw material. As described in the present embodiment, the number of rotations of the motor 213 is equal to the number of rotations of the container 211 if the motor 213 is directly operated with the container 211.

The electrically charging apparatus 202 is an apparatus that applies an electric charge to the raw material 300 and has the raw material 300 be electrically charged. In a case of the present embodiment, the electrically charging apparatus 202 includes a charging electrode 221, a charging power source 222 and a ground apparatus 223. Also, the container 211 functions as a part of the electrically charging apparatus 202.

The charging electrode 221 is a member that induces an electric charge to the container 211, which is located close to it and grounded, by having a higher or lower voltage than an earth, and is also a circular member located to surround a tip of the container 211. Moreover, the charging electrode 221 also functions as the blower tube 206 that guides a gas flow from the gas flow generation apparatus 203 to the sub cylindrical body 132 of the mix apparatus 130.

A size of the charging electrode 221 needs to be bigger than a diameter of the container 211, and it is appropriate that its diameter is selected to be something in a range from 200 mm to 800 mm.

The charging power source 222 is a power that can apply a high voltage to the charging electrode 221. In general, it is preferable that the charging power source 222 is a direct current power supply. Especially, if it is not affected by an electrically charged polarity generated for the fibers 301 and if the fibers 301 are collected on the polarity by using an electric charge generated for the fibers 301, it is preferable to be a direct current power supply. If it is for any case other than that, an alternative current power supply may be used. Also, if the charging power source 222 is a direct current power supply, it is preferable that a voltage the charging power source 222 applies to the charging electrode 221 is set to be something in a range from 10 KV to 200 KV. Especially, because intensity of an electric field between the container 211 and the charging electrode is critical, it is preferable that the applied voltage and a layout of the charging electrode 221 are appropriately set to have intensity of an electric field at 1 KV/cm or more.

The ground apparatus 223 is a member that is electrically connected to the container 211 and can maintain the container 211 at a ground potential level. One end of the ground apparatus 223 is something that can function as a brush for retaining the electric connection even if the container 211 is in a rotating state, and other end of that is connected to a ground.

As described in the present embodiment, if an induction method is used to the electrically charging apparatus 202, it is possible to apply an electric charge to the raw material 300 while the container 211 is maintained at the ground potential level. If the container 211 is retained to be at the ground potential level, there is no need to electrically isolate members such as the axial body 212 or the motor 213 that are connected to the container 211, which is preferable since it makes it possible to use a simple structure as the outpouring apparatus 201.

In addition, it is acceptable as the electrically charging apparatus 202 to connect the power to the container 211, maintain the container 211 at a high voltage, and apply an electric charge to the raw material 300. Moreover, it is also acceptable to form the container 211 with an insulation material, and locate the electrode within the container 211, which directly makes contact with the raw material 300 stored in the container 211, and apply an electric charge to the raw material 300 using the concerned electrode.

The gas flow generation apparatus 203 is an apparatus generating a gas flow that changes a flying direction of the raw material 300 outpoured from the container 211 to a direction guided by the mix apparatus 130. In a case of the present invention, the gas flow generation apparatus 203 is mounted on a backside of the motor 213 and generates a gas flow blowing towards the tip of the container 211 from the motor 213. The gas flow generation apparatus 203 can generate wind power that can change the direction of the aforementioned raw material 300 into an axial direction before the raw material 300 outpoured in a radial direction from the container 211 reaches the charging electrode 221. In FIG. 2, the gas flow is indicated by an arrow. In a case of the present invention, as the gas flow generation apparatus 203, an air blower which includes an axial flow fan that forcibly blows an atmosphere around the discharge apparatus 210.

The gas flow generation apparatus 203 may be composed of other air blower such as a sirocco fan. Moreover, it may be something that changes a direction of the raw material 300 outpoured through an introduction of a high pressure gas. Or, it may also be something that changes a gas flow into the inside of the mix apparatus through the vacuum apparatus 102, the acceleration flow generation unit 232 or such. In this case, the fiber manufacturing apparatus 100 does not have an apparatus that proactively generates a gas flow, but in the present invention, it is possible to conceive the gas flow generation apparatus 203 already exists with a fact that a gas flow is generated within the mix apparatus 130. In addition, under a condition where there is no gas flow generation apparatus 203, it is possible to conceive the gas flow generation apparatus 203 already exists with a fact that a gas flow is made to be generated within the mix apparatus 130 through vacuuming with the vacuum apparatus 102.

The blower tube 206 is an air tunnel that guides a gas flow generated by the gas flow generation apparatus 203 to an area close to the container 211. The gas flow guided by the blower tube 206 intersects with the raw material 300 outpoured from the container 211, and changes a flying direction of the raw material 300.

In addition, the discharge apparatus 210 includes a gas flow control apparatus 204 and a heater 205.

The gas flow control apparatus 204 has a function that controls a gas flow to present the gas flow generated by the gas flow generation apparatus 203 from hitting the outpouring hole 216. In a case of the present invention, as the gas flow control apparatus 204, an air trunk is used to guide the gas flow blowing into a specific area. With the gas flow control apparatus 204, because the gas flow does not directly hit the outpouring hole 216, it is possible to prevent the raw material 300 outpouring from the outpouring hole 216 from being evaporated so soon and blocking the outpouring hole 216 as practicably as possible, and allow the raw material 300 to be continuously injected in a stable manner. The gas flow control apparatus 204 may be a windbreak wall that is located on a wind of the outpouring hole 216 and prevents the gas flow from reaching an area close to the outpouring hole 216.

The heater 205 is a heating source that heats up a gas forming a gas flow generated by the gas flow generation apparatus 203. In a case of the present invention, the heater 205 is a circular heater located at the inside of the blower tube 206 and can heat up the gas passing through the heater 205. By heating up the gas flow with the heater 205, it is possible to facilitate evaporation of the raw material 300 outpoured in the space and manufacture fibers in an efficient manner.

Next, the secondary discharge apparatus 220 is explained. Because the secondary discharge apparatus 220 has the same apparatus structure as the aforementioned discharge apparatus 210, it is explained with reference to FIG. 2 and FIG. 3. A different indication number is assigned to a member having a different name, and the indication number concerned is described in a bracket. The same indication number is assigned to a member having the same name.

The secondary outpouring apparatus 251 includes the container 211, the axial body 212 and the motor 213, which is in the same way as the outpouring apparatus 201. For these items, the same explanation can be applicable if the aforementioned "the raw material 300" is regarded as "the secondary raw material 304", and "the fibers 301" is regarded as "the carried material 302", therefore their explanation is omitted.

The secondary electrically charging apparatus 252 is an apparatus that applies an electric charge to the secondary raw material 304 and has the secondary raw material 304 be electrically charged. In the same way as the electrically charging apparatus 202, the secondary electrically charging apparatus 252 includes the charging electrode 221, the charging power source 222 and the ground apparatus 223. Additionally, the container 211 also functions as a part of the secondary electrically charging apparatus 252.

In the same way as the blower tube 206, the secondary blower tube 256 is an air tunnel that guides a gas flow generated by the secondary gas flow generation apparatus 253 to an area close to the container 211. The gas flow guided by the secondary blower tube 256 intersects with the secondary raw material 304 including the carried material 302 outpoured from the container 211, and changes a flying direction of the secondary raw material 304.

In the same way as the gas flow generation apparatus 203, the secondary gas flow generation apparatus 253 is an apparatus that generates a gas flow for changing a flying direction of the secondary raw material 304 outpoured from the container 211 to a direction guided by the mix apparatus 130. The secondary gas flow generation apparatus 253 is mounted on a back side of the motor 213 and generates a gas flow blowing towards a tip of the container 211 from the motor 213. The gas flow generation apparatus 203 can generate wind power that can change the secondary raw material 304 outpoured into an axial direction before the secondary raw material 304 ejected in a radial direction from the container 211 reaches the charging electrode 221. In FIG. 2, the gas flow is indicated by an arrow. In a case of the present invention, as the secondary gas flow generation apparatus 253, an air blower which includes an axial flow fan that forcibly blows an atmosphere around the secondary discharge apparatus 220.

Next, a manufacturing method of the fibers 301 using the fiber manufacturing apparatus 100 consisting of the above structure is explained.

At first, by the gas flow generation apparatus 203 and the secondary gas flow generation apparatus 253, a gas flow is generated within the mix apparatus 130, the blower tube 206 and the secondary blower tube 256. On the other hand, with the vacuum apparatus 102, the aforementioned gas flow is vacuumed from a downstream side below the substrate 101.

Next, the raw material 300 is supplied into the container 211 of the outpouring apparatus 201. The raw material 300 is stored in a separate tank (not shown), and supplied into the container 211 from other end part of the container 211 through a supply path 217 (see FIG. 2). On the other hand, the secondary raw material 304 including the carried material 302 is supplied to the container 211 of the secondary outpouring apparatus 251. The secondary raw material 304 is stored in a separate tank (not shown), and supplied into the container 211 from the other end part of the container 211 through the supply path 217 (see FIG. 2).

Next, while an electric charge is applied to the raw material 300 stored in the container 211 by the charging power source 222 (an electric charging process), the container 211 is rotated by the motor 213 to have the electrically charged raw material 300 be outpoured from the outpouring hole 216 through a centrifugal force (an outpouring process). On the other hand, while an electric charge is supplied to the secondary raw material 304 stored in the container 211 by the charging power source 222 (a secondary electric charging process), the container 211 is rotated by the motor 213 to have the electrically charged secondary raw material 304 be outpoured from the outpouring hole 216 through a centrifugal force (a secondary outpouring process).

Here, a polarity of the electric charge supplied to the raw material 300 and a polarity of the electric charge supplied to the secondary raw material 304 including the carried material 302 are reversed relative to each other.

A flying direction of the raw material 300 outpoured radially in a radial direction of the container 211 is changed by a gas flow, and the raw material 300 gets on the gas flow and is guided and conveyed by the mix apparatus 130 (a conveying process). The fibers 301 are manufactured from the raw material 300 through an electrostatic stretching phenomenon (a fiber manufacturing process) and outpoured from the discharge apparatus 210. In addition, the aforementioned gas flow, which is heated up by the heater 205, guides a flight of the raw material 300 and facilitates evaporation of the solvent medium by applying heat to the raw material 300. On the other hand, the secondary raw material 304 including the carried material 302 is outpoured radially in a radial direction of the container 211 and its flight direction is changed by the gas flow. The secondary raw material 304 is outpoured from the secondary discharge apparatus 220, as it is cut off into a tiny liquid drop through an electrostatic explosion phenomenon. In addition, the aforementioned gas flow, which is heated up by the heater 205, guides a flight of the secondary raw material 304 and facilitates evaporation of the solvent medium by applying heat to the secondary raw material 304.

Next, the fibers 301, which are discharged from the discharge apparatus 210 and manufactured through an electrostatic stretching phenomenon, the raw material 300, the carried material 302, which is discharged from the secondary discharge apparatus 220 and becomes a tiny liquid drop through an electrostatic explosion phenomenon, and the secondary raw material 304 all join together with a gas flow and are mixed by the mix apparatus 130 (a mixing process).

Next, because the fibers 301 and the secondary raw material 304 including the carried material 302 are electrically charged with polarities reversed relative to each other, an attracting force is generated, which makes the carried material 302 adhere on the surface of the fibers 301, so that as the carried material 302 is adhered on the surface of the fibers 301, they are conveyed on the gas flow into the inside of the mix apparatus 130 (a conveying process). At this stage, the fibers 301 come to carry the carried material 302.

The fibers 301, which carry the carried material 302 and go through the inside of the accelerator 236, are speeded up by an injected flow of the high pressure gas, are compressed gradually as the inside of the accelerator 236 gets narrower, become in a high density state, and reach the substrate 101. The substrate 101 functions as a filter because the gas flow is vacuumed from a backside (a downstream side) of it by the vacuum apparatus 102, it separates the fibers 301 from the gas flow, and deposits and collects the fibers 301 only (a collection process). The substrate 101, where the fibers 301 are deposited on, moves at a certain moving speed by a rolling up of the conveying apparatus 104 so that the fibers 301 deposited on the substrate 101 move together with the substrate 101 as they form a nonwoven fabric cloth and are rolled up by the conveying apparatus 104.

Examples of polymeric substances consisting of the fibers 301 include polypropylene, polyethylene, polystyrene, polyethylene oxide, polyethylene terephthalate, polybutylene terephthalate, polyethylene naphthalate, poly-m-phenylene terephthalate, poly-p-phenylene isophthalate, polyvinylidene fluoride, polyvinylidene fluoride-hexafluoropropylene copolymer, polyvinyl chloride, polyvinylidene chloride-acrylate copolymer, polyacrylonitrile, polyacrylonitrile-methacrylate copolymer, polycarbonate, polyarylate, polyester carbonate, nylon, aramid, polycaprolactone, polylactic acid, polyglycolic acid, collagen, polyhydroxybutyric acid, polyvinyl acetate, and polypeptide. One kind of substances selected from among the above examples may be used, or various kinds of substances may be combined. Because items above are just examples, the present invention is not limited to the above polymeric substances.

Examples as a solvent medium used for the raw material 300 include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, chloroform, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, pyridine, and water. One kind of substances selected from among the above examples may be used, or various kinds of substances may be combined. Because items above are just examples, the present invention is not limited to the above polymeric substances.

In addition, it is possible to add some additive agent such as aggregates or plasticizing agent into the raw material 300. Examples of the concerned additive agent include oxides, carbides, nitrides, borides, silicides, fluorides, sulfides, and so on but it is preferable to use oxides from a view point such as a heat resistant property and a processability. Examples of the concerned oxides include $Al_2O_3$, $SiO_2$, $TiO_2$, $Li_2O$, $Na_2O$, $MgO$, $CaO$, $SrO$, $BaO$, $B_2O_3$, $P_2O_5$, $Sn_2$, $ZrO_2$, $K_2O$, $Cs_2O$, $ZnO$, $Sb_2O_3$, $As_2O_3$, $CeO_2$, $V_2O_5$, $Cr_2O_3$, $MnO$, $Fe_2O_3$, $CoO$, $NiO$, $Y_2O_3$, $Lu_2O_3$, $Yb_2O_3$, $HfO_2$, and $Nb_2O_5$. One kind of materials selected from among the above examples may be used, or various kinds of materials may be combined. Because items above are just examples, the present invention is not limited to the above polymeric substances.

A mixing ratio of a solvent medium with a high-molecule substance is depended on a type of the solvent medium and of the high-molecule substance, but it is preferable that an amount of the solvent medium is chosen to be something in a range from 60 percent to 98 percent.

The carried material 302 is not especially limited to a substance having some functionality. For example, it is possible to pick up photoactive metal oxides and so on. For example, there are zinc oxides, titanium oxides and so forth. The photoactive metal oxides are activated by light such as visible light (for example, zinc oxides) or ultraviolet light ($T_iO_2$) and demonstrate a catalytic function. Therefore, as described in the present invention, if fine particles of the photoactive metal oxides are attached on a surface of the nano-fibers and the nano-fibers concerned is forming a nonwoven fabric cloth, it is possible to have light reach the fine particles in an efficient manner, and have the photoactive metal oxides demonstrate effects sufficiently.

In addition, as the carried material 302, it is possible to pick up those that absorb ingredients of smell such as an active charcoal, those that can demonstrate an antibacterial function or a disinfecting function such as silver or copper, and those that provide a hydrophilic property or a hydrophobic property.

Figure 4:
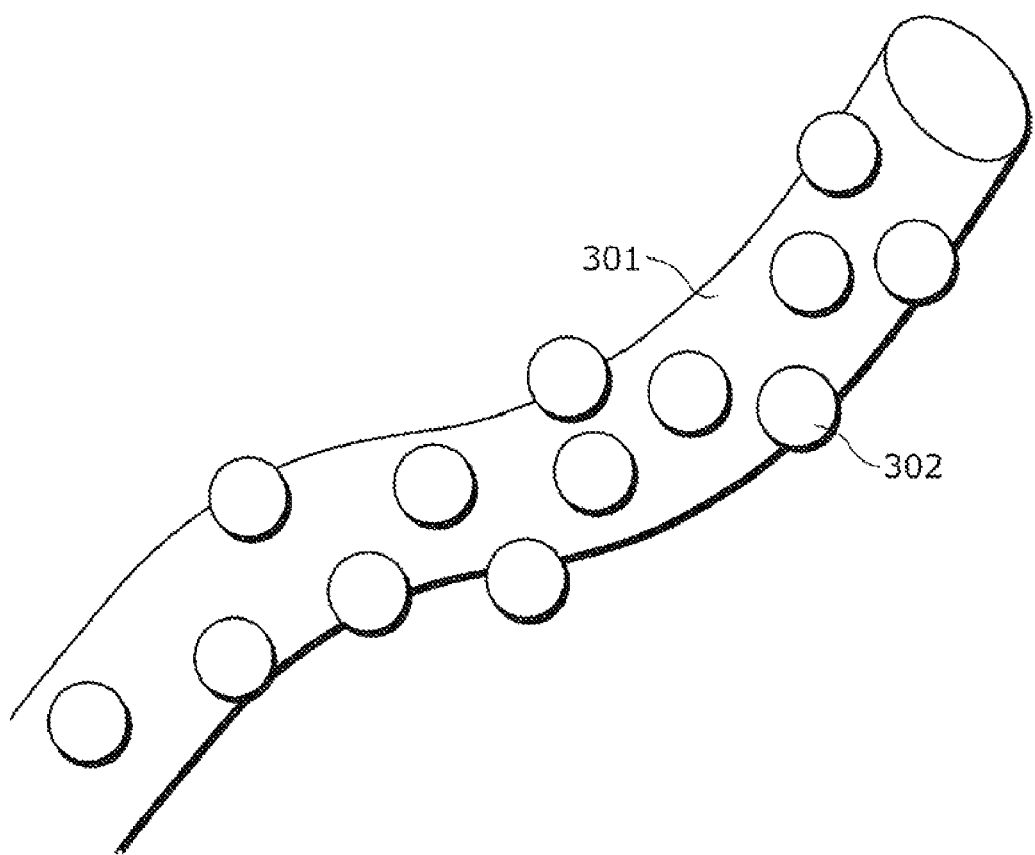
FIG. 4 is a view that schematically shows fibers that carry a carried material.

According to the above apparatus structure and method, it is possible to manufacture the fibers 301 carrying the carried material 302 only on its surface. Therefore, because a mechanical strength of the fibers 301 is not decreased by mixing the carried material 302 into inside of the fibers 301 and, as shown in FIG. 4, because the carried material 302 is carried only on the surface of the fibers 301, the function of the carried material 302 can be sufficiently performed.

In addition, since the carrying fibers 301 and the carried material 302 are electrically charged with a polarity opposite to each other, the carried material 302 is securely carried on the surface of the fibers 301.

Moreover, because the fibers 301 manufactured through an electrostatic stretching phenomenon are mixed with the secondary raw material 304 which has been a tiny liquid drop through an electrostatic explosion, or the carried material 302, in a dispersion form, and they are evenly mixed, it is possible to manufacture the fibers 301 of which performance are stable as an overall.

Embodiment 2

Next, other embodiment according to the present invention is explained.

Figure 5:
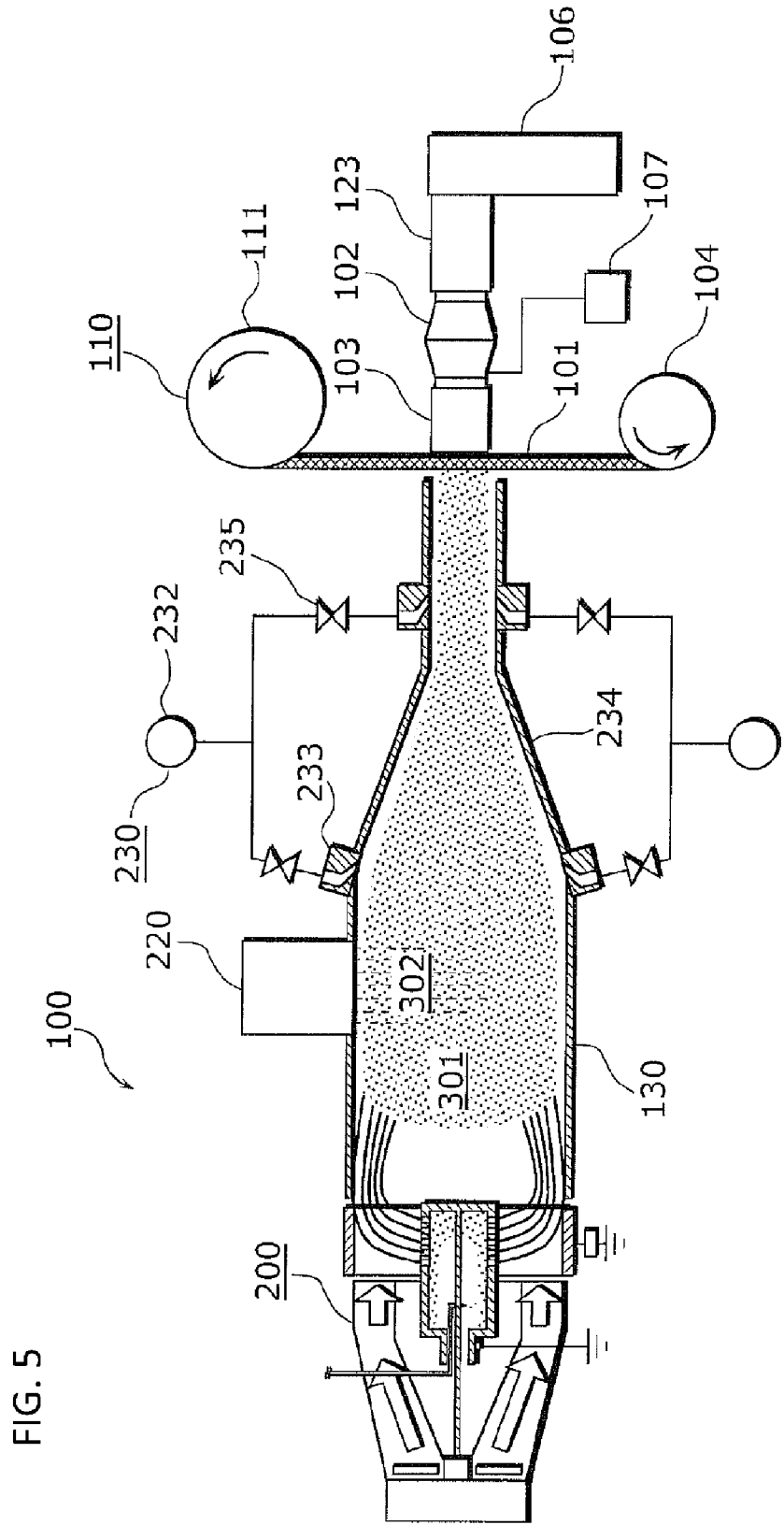
FIG. 5 is a cross-section view that schematically shows a fiber manufacturing apparatus in an embodiment according to the present invention.

FIG. 5 is a cross-section view that schematically shows a fiber manufacturing apparatus in the embodiment according to the present invention. The same indication number is assigned to a member, an apparatus, and so on having the same function as those in the above embodiment 1.

As shown in the same diagram, the fiber manufacturing apparatus 100 includes the discharge apparatus 210, the mix apparatus 130, the secondary discharge apparatus 220, the accelerator 236 and the collection apparatus 110. Because the discharge apparatus 210, the accelerator 236 and the collection apparatus 110 are the same as above, their explanation is omitted.

The secondary discharge apparatus 220 in the present embodiment includes a secondary discharge apparatus that sprays the secondary raw material 304 including the carried material 302 by using ultrasonic sounds or a two fluid nozzle and discharges it into the space, and a secondary electrically charging apparatus that electrically charges the outpoured carried material 302 with a polarity opposite to a polarity of the electrically charged fibers 301 by using an ionizer. The secondary discharge apparatus 220 is installed to the side of the mix apparatus 130, which is explained later, and is capable to spray the electrically charged carried material 302 into the inside of the mix apparatus 130.

Here, the ionizer is an apparatus that can electrically charge a fine particle existing in the space. To be more specific, it is any discretional methods such as a corona electrical discharge method, a superimposed voltage method, an alternating current method, a steady direct current method, a pulse direct current method, a self-discharge method, a soft x-ray method, an ultraviolet ray method, a radiation ray method and so on.

The mix apparatus 130 is a member that mixes the fibers 301 discharged from the discharge apparatus 210 and the secondary raw material 304 sprayed from the secondary discharge apparatus 220. In a case of the present invention, the mix apparatus 130 is a tube in a cylindrical form that connects the discharge apparatus 210 with the accelerator 236 in a straight line, which is also a guiding tube that guides a gas flow for conveying the fibers 301 from the discharge apparatus 210 to the accelerator 236. In addition, the mix apparatus 130 has the secondary discharge apparatus 220 installed on its surrounding wall.

From the above configuration, while the fibers 301 discharged from the discharge apparatus 210 are conveyed to the accelerator 236, the tiny carried material 302 sprayed from the secondary discharge apparatus 220 is mixed. Here, since the fibers 301 and the carried material 302 are electrically charged with a polarity opposite to each other, it is possible to manufacture the fibers 301 that carry the carried material 302 on their surface in a simple method.

In the above embodiment 1, by cutting the liquid including the carried material 302 into a fine form, it is made to be carried on the surface of the fibers 301. However, the present invention is not only limited to this. For example, with using an apparatus such as the one shown in the embodiment 2, a powder (a fine powder) of the carried material 302 as the secondary raw material may be electrically charged as it is in a solid substance form, and dispersed in the space and mixed with the fibers 301.

Embodiment 3

Next, using a fiber manufacturing apparatus according to the present invention, an embodiment of a method and an apparatus for manufacturing fibers used for a catalyst substance layer for a proton-exchange membrane fuel cell is explained (a manufacturing method of a catalyst substance layer for fuel cell, a manufacturing apparatus of a catalyst substance layer for a fuel cell, a proton-exchange membrane fuel cell).

FIG. 6 is a cross-section view that schematically shows a fiber manufacturing apparatus in the embodiment according to the present invention.

As shown in the same diagram, the fiber manufacturing apparatus 100 is an apparatus that mixes the fibers 301 discharged from the discharge apparatus 210, a third raw material 305 including an electric conductor discharged from a third discharge apparatus 230, the secondary raw material 304 including the carried material 302 that includes a solvent medium discharged from the secondary discharge apparatus 220 in the space, and has the electric conductor 303 and the carried material 302 be carried on the surface of the fibers 301, and it is an apparatus that can deposits the concerned fibers and manufacture a catalyst substance layer. The fiber manufacturing apparatus 100 includes the discharge apparatus 210, the third discharge apparatus 230, the secondary discharge apparatus 220, the mix apparatus 130, the collection apparatus 110 and an attractant apparatus 120.

FIG. 7 is a cross-section view that shows a discharge apparatus.

FIG. 8 is a perspective view that shows an external appearance of the discharge apparatus.

Because the third discharge apparatus 230 and the secondary discharge apparatus 220 have the same configuration as the discharge apparatus 210, their explanation is omitted. As to the third discharge apparatus, "the raw material 300" described below may be interpreted as "the third raw material 305", "the fibers 301" may be interpreted as "the third raw material 305", and as to the secondary discharge apparatus 220, "the raw material 300" may be interpreted as "the secondary raw material 304", and "the fibers 301" may be interpreted as "the carried material 302".

As shown in these diagrams, the discharge apparatus 210 is a unit that can discharge the fibers 301, which are manufactured from the electrically charged raw material 300 or the concerned raw material 300 through an electrostatic stretching phenomenon while flying, on a gas flow and that includes the outpouring apparatus 201, the electrically charging apparatus 202, the blower tube 206 and the gas flow generation apparatus 203.

The outpouring apparatus 201 is an apparatus that outpours the raw material 300 into the space, and it is an apparatus that outpours the raw material 300 in a radial pattern through a centrifugal force in the present embodiment. The outpouring apparatus 201 includes the container 211, the axial body 212 and the motor 213.

The container 211 is a container, which allows the raw material 300 to be outpoured into the space through the centrifugal force generated by rotations of itself as the raw material 300 is injected into the inside of the container 211, is a cylindrical shape of which one end is closed, and has many outpouring holes 216 on its surrounding wall. The container 211 is formed of an electric conductor to apply an electric charge to the raw material 300 reserved. The container 211 is supported by a bearing (not shown) located at a supporting structure (not shown), which makes it possible to rotate.

To be more specific, it is appropriate if a diameter of the container 211 is chosen to be something in a range from 10 mm to 300 mm. Because if it is too big, it becomes difficult to centralize the raw material 300 or the fibers 301 with a gas flow, which is explained later. Also, it is because big vibrations are generated if a weight becomes off-balance even just a little due to some factor such as a rotation axis of the container 211 being eccentric, and thereby requiring a structure that rigidly supports the container 211 to restrain the concerned vibrations. On the other hand, if it is too small, it becomes necessary to increase rotations to discharge the raw material 300 through a centrifugal force, which may cause problems of generating extra loads or vibration of a driving source. In addition, it is preferable that a diameter of the container 211 is chosen to be something in a range from 20 mm to 100 mm.

In addition, it is preferable that a shape of the outpouring hole 216 is a circle, and its diameter is preferable to be chosen from something approximately in a range from 0.01 mm to 3 mm, though it is depending on a thickness of the container 211. Because it becomes difficult to outpour the raw material 300 to the outside of the container 211 if the outpouring hole 216 is too small. Because, if the outpouring hole 216 is too big, an amount of the raw material 300 outpoured from one of the outpouring holes per a certain period of time becomes too much (i.e. a thickness of a line formed by the discharged raw material 300 becomes too thick), so that it becomes difficult to manufacture the fibers 301 having a desirable diameter.

The container 211 does not have to be a member that outpours the raw material 300 into the space through a centrifugal force of its own rotations, it may also be a member that outpours the raw material 300 from the outpouring hole 216 by pressurizing the raw material 300 while the container 211 itself stays still. Also, the shape of the container 211 that outpours the raw material 300 through a centrifugal force is not limited to a cylindrical shape, and it may have a polygonal tube in a polygonal shape or a conical shape on its cross-section surface. It may be any shape as long as the raw material 300 can be outpoured from the outpouring hole 216 through a centrifugal force by rotations of the outpouring hole 216. Also, a shape of the outpouring hole 216 is not limited to a circular shape, and it may be something else such as a polygonal shape or a star shape.

The axial body 212 is an axial body that rotates the container 211 and conveys a driving power to outpour the raw material 300 through a centrifugal force, and is a stick type body that is inserted from other end of the container 211 to the inside of the container 211, and of which one end is connected with an occluded part of the container 211. Also, the other end is connected with a rotation axis of the motor 213.

The motor 213 is an apparatus that applies a rotation driving power to the container 211 via the axial body 212 for outpouring the raw material 300 from the outpouring hole 216 with a centrifugal force. It is preferable that the number of rotations for the container 211 is selected to be something in a range from a few rpm to 10000 rpm depending on an opening diameter of the outpouring hole 216, viscosity of the raw material 300 and a type of polymeric substances within the raw material. As described in the present embodiment, the number of rotations of the motor 213 is equal to the number of rotations of the container 211 if the motor 213 is directly operated with the container 211.

The electrically charging apparatus 202 is an apparatus that applies an electric charge and has the raw material 300 be electrically charged. In a case of the present embodiment, the electrically charging apparatus 202 includes a charging electrode 221, a charging power source 222 and a ground apparatus 223. Also, the container 211 functions as a part of the electrically charging apparatus 202.

The charging electrode 221 is a member that induces an electric charge to the container 211, which is located close to it, and grounded by having a higher or lower voltage than an earth, and is also a circular member located to surround a tip of the container 211. If a positive voltage is applied to the charging electrode 221, a negative electric charge is induced to the container 211. If a negative voltage is applied to the charging electrode 221, a positive electric charge is induced to the container 211. Moreover, the charging electrode 221 also functions as the blower tube 206 that guides a gas flow from the gas flow generation apparatus 203 to the mix apparatus 130.

A size of the charging electrode 221 needs to be bigger than a diameter of the container 211, and it is appropriate that its diameter is selected to be something in a range from 200 mm to 800 mm. A shape of the charging electrode 221 is not limited to a circular shape, and it may be a member being a polygonal circle in a polygonal shape.

The charging power source 222 is a power that can apply a high voltage to the charging electrode 221. It is preferable that the charging power source 222 is a direct current power supply. Also, if the charging power source 222 is a direct current power supply, it is appropriate that the voltage that the charging power source 222 applies to the charging electrode 221 is set to be something in a range from 10 KV to 200 KV. If a negative voltage is applied to the charging power source 222, a polarity of the aforementioned voltage applied becomes negative. Especially, because intensity of an electric field between the container 211 and the charging electrode is critical, it is preferable that the applied voltage and a layout of the charging electrode 221 are appropriately set to have intensity of an electric field at 1 KV/cm or more.

The ground apparatus 223 is a member that is electrically connected to the container 211 and can maintain the container 211 at a ground potential level. One end of the ground apparatus 223 is something that can function as a brush for retaining the electric connection even if the container 211 is in a rotating state, and other end of that is connected to a ground.

As described in the present embodiment, if an induction method is used to the electrically charging apparatus 202, it is possible to apply an electric charge to the raw material 300 while the container 211 is maintained at the ground potential level. If the container 211 is retained to be at the ground potential level, there is no need to electrically isolate members such as the axial body 212 or the motor 213 that are connected to the container 211, which is preferable since it makes it possible to use a simple structure as the outpouring apparatus 201.

In addition, it is acceptable as the electrically charging apparatus 202 to connect the power to the container 211, maintain the container 211 at a high voltage, and apply an electric charge to the raw material 300 by grounding the charging electrode 221. Moreover, it is also acceptable to form the container 211 with an insulation material, and locate the electrode within the container 211, which directly makes contact with the raw material 300 stored in the container 211, and apply an electric charge to the raw material 300 using the concerned electrode.

Figure 7:
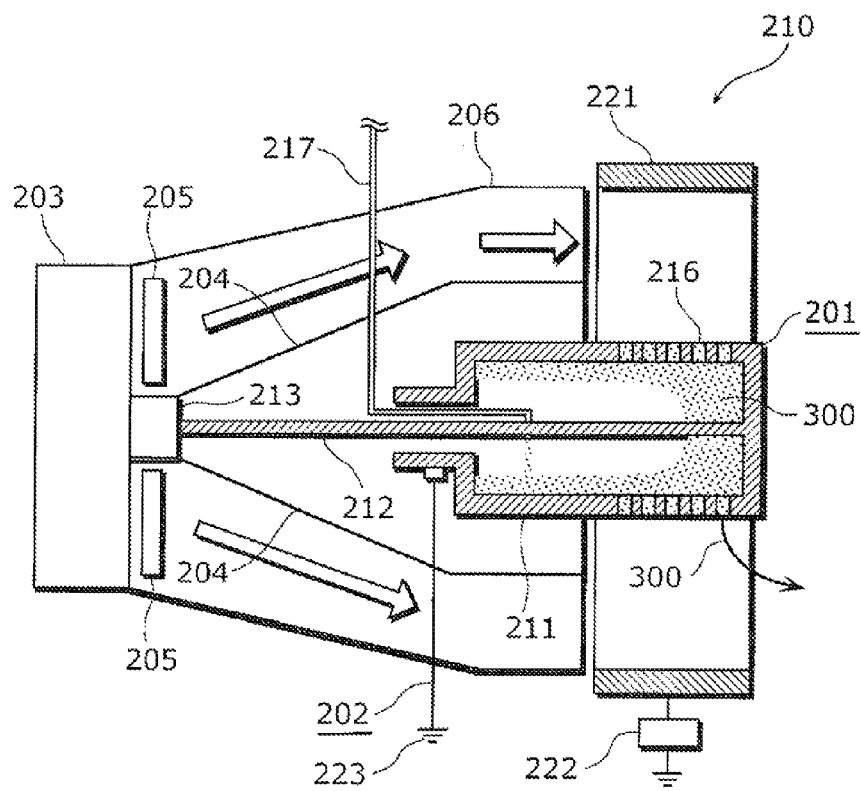
FIG. 7 is a cross-section view that shows an injection apparatus.
Figure 8:
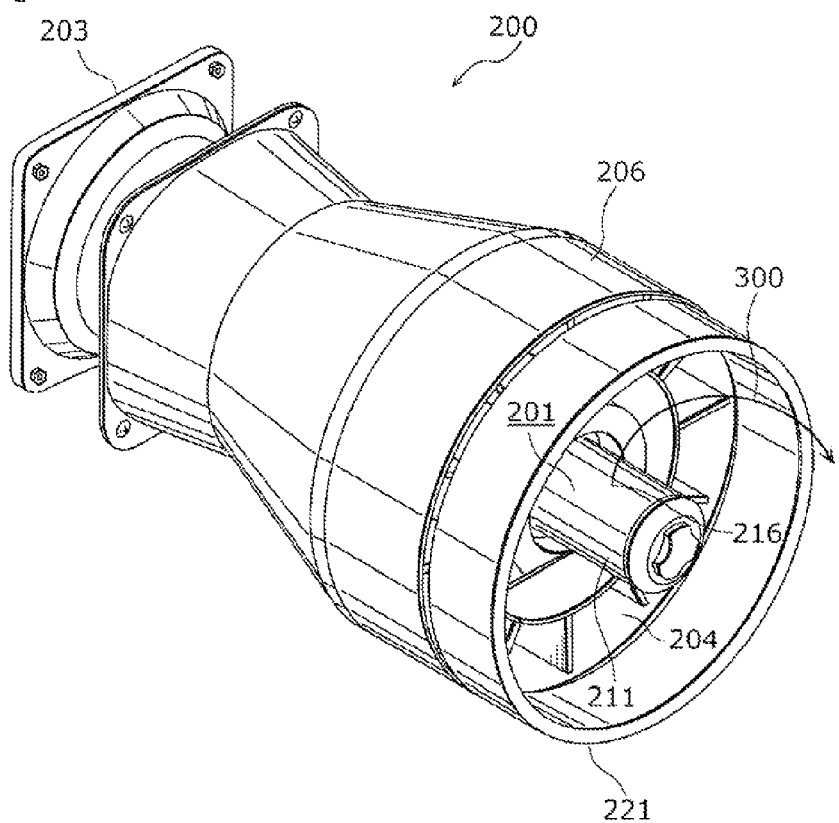
FIG. 8 is a perspective view that shows an external appearance of the injection apparatus.

The gas flow generation apparatus 203 is an apparatus generating a gas flow that changes a flying direction of the raw material 300 outpoured from the container 211 to a direction guided by the mix apparatus 130. The gas flow generation apparatus 203 is mounted on a back side of the motor 213 and generates a gas flow blowing towards the tip of the container 211 from the motor 213. The gas flow generation apparatus 203 can generate wind power that can change the direction of the aforementioned raw material 300 into an axial direction before the raw material 300 outpoured in a radial direction from the container 211 reaches the charging electrode 221. In FIG. 7, the gas flow is indicated by an arrow. In a case of the present invention, as the gas flow generation apparatus 203, an air blower which includes an axial flow fan that forcibly blows an atmosphere around the discharge apparatus 210.

The gas flow generation apparatus 203 may be composed of other air blower such as a sirocco fan. Moreover, it may be something that changes a direction of the raw material 300 outpoured through an introduction of a high pressure gas. Or, it may also be something that changes a gas flow into the inside of the mix apparatus through the vacuum apparatus 102 or such. In this case, the gas flow generation apparatus 203 does not have an apparatus that proactively generates a gas flow, but in the present invention, it is possible to conceive the gas flow generation apparatus 203 already exists with a fact that a gas flow is generated within the mix apparatus 130. In addition, under a condition where there is no gas flow generation apparatus 203, it is possible to conceive a gas flow generation apparatus is supposed to already exist with a fact that a gas flow is made to be generated within the blower tube 206 and the mix apparatus 130 through vacuuming with the vacuum apparatus 102.

The blower tube 206 is a conduit tube that guides a gas flow generated by the gas flow generation apparatus 203 to an area close to the container 211. The gas flow guided by the blower tube 206 intersects with the raw material 300 outpoured from the container 211, and changes a flying direction of the raw material 300.

In addition, the discharge apparatus 210 includes the gas flow control apparatus 204 and the heater 205.

The gas flow control apparatus 204 has a function that controls a gas flow to present the gas flow generated by the gas flow generation apparatus 203 from hitting the outpouring hole 216. In a case of the present invention, as the gas flow control apparatus 204, an air trunk is used to guide the gas flow blowing into a specific area. With the gas flow control apparatus 204, because the gas flow does not directly hit the outpouring hole 216, it is possible to prevent the raw material 300 outpouring from the outpouring hole 216 from being evaporated so soon and blocking the outpouring hole 216 as practicably as possible, and allow the raw material 300 to be continuously injected in a stable manner. The gas flow control apparatus 204 may be a windbreak wall that is located on a wind of the outpouring hole 216 and prevents the gas flow from reaching an area close to the outpouring hole 216.

The heater 205 is a heating source that heats up a gas forming a gas flow generated by the gas flow generation apparatus 203. In a case of the present embodiment, the heater 205 is a circular heater located at the inside of the mix apparatus 130 and can heat up the gas passing through the heater 205. By heating up the gas flow with the heater 205, it is possible to facilitate evaporation of the raw material 300 outpoured in the space and manufacture fibers in an efficient manner.

Figure 6:
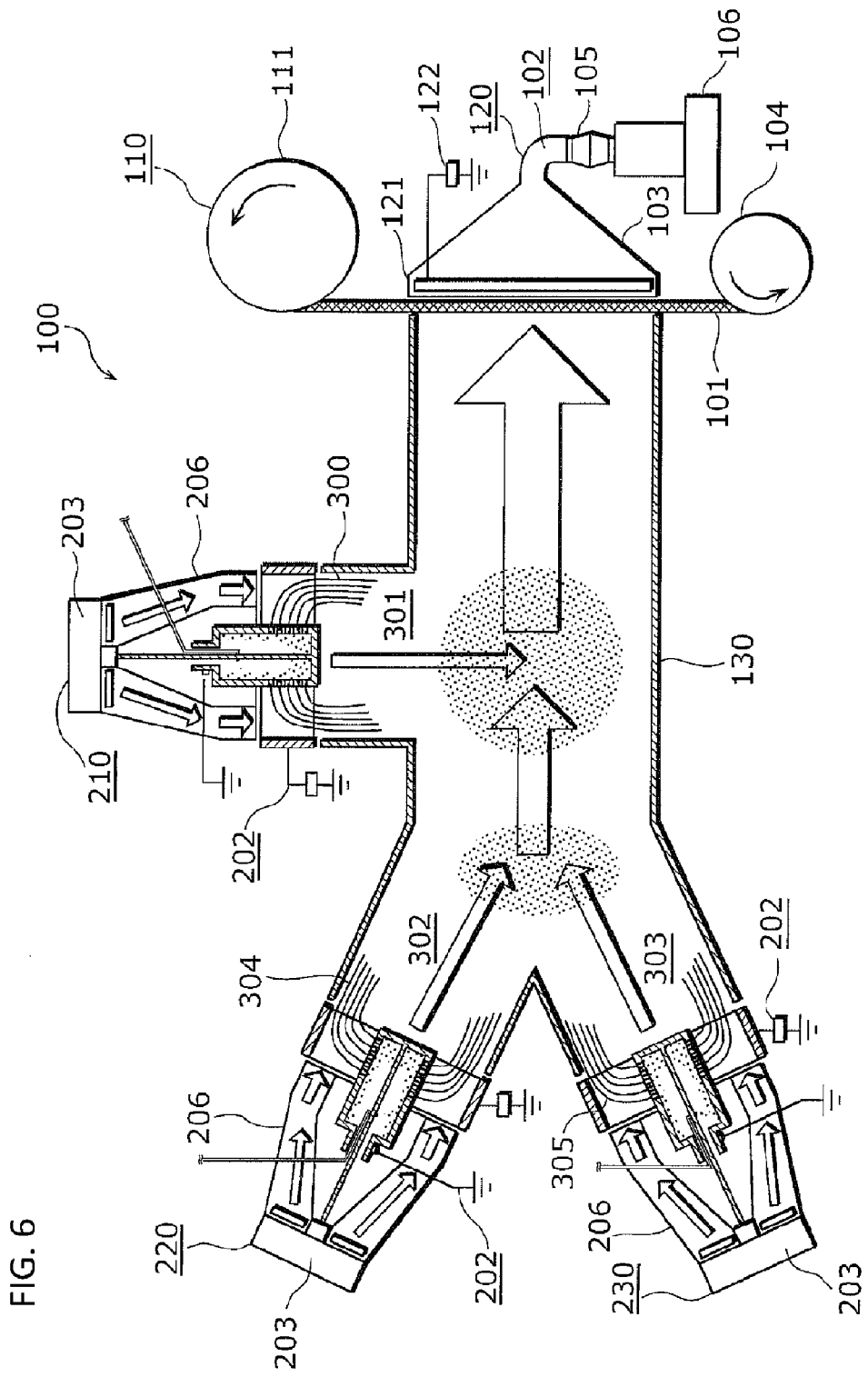
FIG. 6 is a cross-section view that schematically shows a fiber manufacturing apparatus in an embodiment according to the present invention.

Going back to a reference to FIG. 6.

The mix apparatus 130 is a member that mixes the fibers 301 (the raw material 300) discharged from the discharge apparatus 210, the electric conductor 303 (the third raw material 305) discharged from the third discharge apparatus 230, the carried material 302 (the secondary raw material 304) discharged from the secondary discharge apparatus 220 with a gas flow. In a case of the present embodiment, the mix apparatus 130 is a tubular member, which is connected in a Y shape, so that the electric conductor 303 and the carried material 302, which are respectively generated at different locations, are guided to converge at one location, and have the converged electric conductor 303 and carried material 302 be mixed, and moreover which is also a member having a branching part that mixes these confluent electric conductor 303 and the carried material 302 and the fibers 301.

The collection apparatus 110 is an apparatus that collects the fibers 301 discharged from the mix apparatus 130, the electric conductor 303 and the carried material 302, and includes the substrate 101, the conveying apparatus 104 and a supply roll.

The substrate 101 is a member where the fibers 301, which are manufactured through an electrostatic stretching phenomenon and flies, the electric conductor 303 and the carried material 302 are deposited on. In a case of the present embodiment, the substrate 101 is a sheet having many holes, which is made of a carbon located to form layers on a thin, flexible and long sheet type of a member. By doing this, it is possible to easily supply a relatively fragile carbon sheet, and collect the carbon sheet by rolling it up. If such a carbon sheet is incorporated into the fuel cell, it functions as a gas diffusion layer.

The substrate 101 may be a sheet made from a proton conductive polymer.

The conveying apparatus 104 is an apparatus that can convey the substrate 101. In a case of the present embodiment, it is supposed to draw the long substrate 101 from a supply roll by rolling it up, and conveys the substrate 101 together with the fibers 301, the electric conductor 303 and the carried material 302, which are deposited in a nonwoven fabric cloth form. The conveying apparatus 104 is an apparatus that can roll up the fibers 301 deposited in a nonwoven fabric cloth form together with the substrate 101.

The attractant apparatus 120 is an apparatus for attracting the fibers 301, which fly in the space and are combined with the third raw material 305 and the solvent medium on its surface, into a specific location. As to a method attracting the fibers 301 and such, examples include a method for attracting the fibers 301 and so on by vacuuming a gas flow, and a method for attracting the fibers 301 electrically charged by an electric field. In a case of the present embodiment, an apparatus that can conduct selectively a method that vacuums a gas flow or a method that attracts with an electric field, or can conduct both at the same time, is used as an attractant apparatus, which includes the vacuum apparatus 102, an attractant electrode 121 and an attractant power source 122.

The vacuum apparatus 102 is an apparatus that compulsively vacuums a gas flow that passes through the substrate 101. In the present embodiment, the vacuum apparatus 102 includes the area restriction unit 103 in a funnel shape and an air blower 105. The air blower 105 is an air blower such as a sirocco fan or an axial flow fan, which is an apparatus that can generate a gas flow blowing to the air blower 105 from the substrate 101.

Also, the vacuum apparatus 102 is an apparatus that can vacuum most of the gas flow combining the raw material 300, the third raw material 305 and a solvent medium evaporated from the secondary raw material 304, and convey the aforementioned gas flow to the solvent retrieving apparatus 106 connected to the vacuum apparatus 102.

The attractant electrode 121 is an electrode for generating an electric field that induces the fibers 301 and such. In a case of the present embodiment, a metal net that can have a gas flow go through is adopted.

The attractant power source 122 is a direct current power supply that can maintain the attractant electrode 121 at a certain voltage and with a certain polarity. In a case of the present embodiment, the attractant power source 122 is a direct current power supply that can change a voltage and a polarity freely in a range from 0 V (in an installation state) to 200 KV.

Next, a method, which manufactures fibers using the fiber manufacturing apparatus 100 in an above structure, and further manufactures a catalyst substance layer for a fuel cell, is explained.

At first, the gas flow generation apparatus 203 mounted respectively on the discharge apparatus 210, the third discharge apparatus 230 and the secondary discharge apparatus 220 is operated. By doing so, a gas flow is generated in the inside of the blower tube 206 and in the inside of the mix apparatus 130. On the other hand, the aforementioned gas flow is vacuumed from a backside of the substrate 101 by the vacuum apparatus 102.

In addition, a voltage is applied the attractant electrode 121 by the attractant power source 122 to generate an electric field for attracting the fibers 301 and so forth.

Next, the raw material 300 is supplied to the container 211 included in the discharge apparatus 210. As to the third raw material 305, the raw material 300 is also supplied to the container 211 in the same way. As to the secondary raw material 304, it is also supplied to the container 211 in the same way. The raw material 300, the third raw material 305 and the secondary raw material 304 are respectively stored in a separate tank (not shown), and supplied in the inside of the container 211 from other end part of the container 211 via the supply path 217 (see FIG. 7).

At the same time, an electric charge is applied to the raw material 300 stored in the container 211 by the electrically charging apparatus 202. In addition, an electric charge is also applied in the same way to the third raw material 305 and the secondary raw material 304 (an electric charging process, a third electric charging process and a secondary electric charging process).

Here, a polarity of the electric charge applied to the raw material 300 and a polarity of the electric charge applied to the third raw material 305 are opposite to each other. Also, an amount of the electric charge (an absolute value) supplied to the raw material 300 is more than an amount of the electric charge (an absolute value) supplied to the third raw material 305. On the other hand, a polarity of the electric charge applied to the third raw material 305 and a polarity of the electric charge applied to the secondary raw material 304 are opposite to each other. In addition, an amount of the electric charge (an absolute value) supplied to the raw material 305 is more than an amount of the electric charge (an absolute value) supplied to the third raw material 304. From the explanation above, even if the electric conductor 303 and the carried material 302 having a polarity opposite to each other are combined, a secondary carried material, which retains an electrically charged polarity of an electric conductor, is formed, and the electrically charged polarity of the fibers 301 and the electrically charged polarity of the aforementioned secondary carried material are opposite to each other.

The amount of the electric charge and the polarity assigned to the raw material 300, the third raw material 305 and the secondary raw material 304 can be adjusted by the voltage and the polarity applied to the charging electrode 221.

At the same time, the raw material 300, the third raw material 305, the secondary raw material 304, which are electrically charged from the outpouring hole 216 through a centrifugal force by rotating the container 211 with the motor 213, are respectively outpoured (a outpouring process, a third outpouring process and a secondary outpouring process).

The third raw material 305 and the secondary raw material 304 are outpoured radially to an axial direction of the container 211, and their flying directions are changed by a gas flow. The third raw material 305 and the secondary raw material 304 are respectively discharged from the third discharge apparatus 230 and the secondary discharge apparatus 220 as they are divided into a tiny liquid drop through an electrostatic explosion. Also, the aforementioned gas flow is heated by the heater 205, which facilitates evaporation of the solvent medium by applying heat to the third raw material 305 and the secondary raw material 304 as the flights of the third raw material 305 and of the secondary raw material 304 are respectively guided.

From the explanation above, the third raw material 305 and the secondary raw material 304 are supposed to be mixed in the inside of the mix apparatus 130 (a mixing process). Because the electric conductor 303 and the carried material 302 are electrically charged with a polarity opposite to each other, an attractive force is generated, which make them be combined with each other to form a secondary carried material. The concerned secondary carried material is conveyed by a gas flow.

On the other hand, a flight direction of the raw material 300 discharged radially into an axial direction of the container 211 is changed by a gas flow, and the raw material 300 is guided on the gas flow and conveyed to the mix apparatus 130 by the blower tube 206 (a conveying process). From the raw material 300, the fibers 301 are manufactured through an electrostatic stretching phenomenon (a fiber manufacturing process) and discharged from the discharge apparatus 210. Moreover, the aforementioned gas flow, which is heated by the heater 205, applies heat to the raw material 300 and facilitates evaporation of the solvent medium as it guides a flight of the raw material 300.

Next, the fibers 301, which are discharged from the discharge apparatus 210 and manufactured through an electrostatic stretching phenomenon, and the aforementioned carried material join together with the gas flow and they are mixed by the mix apparatus 130 (a mixing process). Here, the fibers 301 and the carried material are electrically charged with a polarity opposite to each other, an attractive force is generated so that they are conveyed on the gas flow into the inside of the mix apparatus 130 as the carried material is adhered on the surface of the fibers 301 (a conveying process). At this stage, the fibers 301 are supposed to carry the third raw material 305 and the secondary raw material 304 including the carried material 302.

In addition, there is a possibility that the third raw material 305 remains to exist without becoming a carried material, or that the secondary raw material including the carried material 302 remains to exist, but these are also mixed with the fibers 301 in the inside of the mix apparatus 130 and combined with the surface of the fibers 301.

Lastly, the fibers 301, which carry the electric conductor 303 and the carried material 302, are attracted on the substrate 101 by the attractant apparatus 120 and deposited on the substrate 101 (a deposition process). In addition, since the electric conductor 303 and the carried material 302, which were not combined with the fibers 301 in the space, are also attracted by the attractant apparatus 120, there is a case that they are combined with the surface of the fibers 301, which have been deposited before.

Here, the raw material 300, the secondary raw material 304 and the third raw material 305 are explained.

The raw material 300 is a liquid that dissolves or disperses a proton conductive polymer in a solvent medium. Regarding a mixing ratio of the solvent medium and the proton conductive polymer, it is desirable that an amount of the solvent medium is something in a range from approx. 60% to 98% though it is different depending on a type of the solvent medium and a type of the proton conductive polymer.

As to the proton conductive polymer making up the fibers 301, perfluorocarbon sulfonic acid type resin can be picked up as a representative example. A perfluorocarbon sulfonic acid type resin is preferable from a viewpoint of its superiority in its chemical and thermal stability. As the concerned resin, examples include Nafion (registered trademark) made by DuPont Com. in the United States, Aciplex (registered trademark) of Asahi Kasei Corporation Limited, Flemion (registered trademark) of Asahi Glass Corporation Limited. Other examples also include sulfonated polyether ketone resin, sulfonated polyether sulfone, sulfonated polyphenylen sulfide resin, sulfonated polymid resin, sulfonated polyamide resin, sulfonated epoxide resin, sulfonated polyolefin resin and so on. Moreover, it may be one type chosen from above, or a combination of multiple types of above. In addition, above items are just examples, and the present invention is not limited to the above polymeric substances.

As a solvent medium used for the raw material 300, it may be something that has a volatile function and examples can include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, chloroform, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, pyridine and water. Moreover, it may be one type chosen from above, or a combination of multiple types of above. In addition, above items are just examples, and the present invention is not limited to the solvent medium of above types.

The third raw material 305 according to the present embodiment is a liquid that dissolves or disperses the electric conductor 303 in a solvent medium. Moreover, it may also be an emulsioned liquid using a molecule that bridges between the electric conductor and the solvent medium.

The electric conductor 303 is a member for moving an electron in the catalyst substance layer, and it is acceptable as long as it is electronically conductive. To be more specific, examples can include a metal, a carbonaceous particle such as an electrically conductive polymer, carbon black, acetylene black, and an electrically conductive polymer internally containing a carbon such as a carbon nano-fiber.

As a solvent medium used for the third raw material 305, it may be something that has a volatile function and examples can include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, chloroform, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, pyridine and water. Moreover, it may be one type chosen from above, or a combination of multiple types of above. In addition, above items are just examples, and the present invention is not limited to the solvent medium of above types.

In a case of the present invention, the secondary raw material 304 is a liquid in which a particle of the carried material 302 as a catalyst substance is dissolved or dispersed in a solvent medium. Also, it may be an emulsioned liquid using a molecule that bridges between the carried material 302 and the solvent medium.

As the carried material 302, materials equivalent to ones used as a conventional catalytic substance in the concerned technical field may be used without any specific limitation. Examples include platinum group elements such as platinum, palladium, iridium, rhodium, ruthenium, osmium, and other metals such as gold, silver, iron, cobalt, nickel, chrome, tungsten, manganese, vanadium, lead, copper, cobalt, molybdenum, gallium, aluminum, or alloyed metals, or an oxidative product, a double oxide of these, and so on. Especially, platinum is used as the catalytic substance in many cases. A diameter of a particle of the carried material 302 is generally 1 to 30 nm. A diameter of a particle of a support agent is preferable to be 0.5 to 20 nm because activities of the catalytic substance are lowered if it is too big and a stability of that is lowered if it is too small. More preferably, it is nice to be 1 to 5 nm.

As a solvent medium used for the secondary raw material 304, it may be something that has a volatile function and examples can include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, chloroform, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, pyridine and water. Moreover, it may be one type chosen from above, or a combination of multiple types of above. In addition, above items are just examples, and the present invention is not limited to the solvent medium of above types.

Through the above apparatus structure and method, it is possible to manufacture the catalyst substance layer made up of the fibers 301 where the electric conductor 303 and the carried material 302 are carried only on its surface. Therefore, it is possible to restrain generation of the electric conductor 303 and the carried material 302, which cannot perform their functions because such electric conductor 303 and carried material 302 are mixed into the inside of the fibers 301, and to improve the performance as the catalytic substance layer. Beside, since the fibers 301 are deposited on a carbon sheet having many holes, it is possible to manufacture a catalyst substance layer, which can be connected to a gas diffusion layer. Furthermore, since the fibers 301 manufactured through an electrostatic stretching phenomenon are mixed with the electric conductor 303 and the carried material 302 in a dispersed form through an electrostatic stretching phenomenon, they are evenly mixed with the fibers 301 without creating clusters in the space, which thereby being possible to manufacture the catalyst substance layer of which performance is stable as an overall.

In the present embodiment, the electric conductor 303 and the carried material 302 are mixed in the inside of the mix apparatus 130. In a case an amount of electric charges is decreased, it is possible to have an electric charging unit such as an ionizer to recharge electrically the electric conductor 303 and the carried material 302 that are mixed as described above with a polarity opposite to a polarity of the electrically charged fibers 301 before mixing them with the electrically charged fibers 301 in the mix apparatus 130 so that they can be mixed with the fibers 301 and the mix apparatus 130 after they are electrically charged with a polarity opposite to a polarity of the electrically charged fibers 301.

Next, an example that fibers manufactured through the fiber manufacturing apparatus and the fiber manufacturing method according to the present invention is applied to a proton-exchange membrane fuel cell is explained with reference to diagrams.

Figure 9:
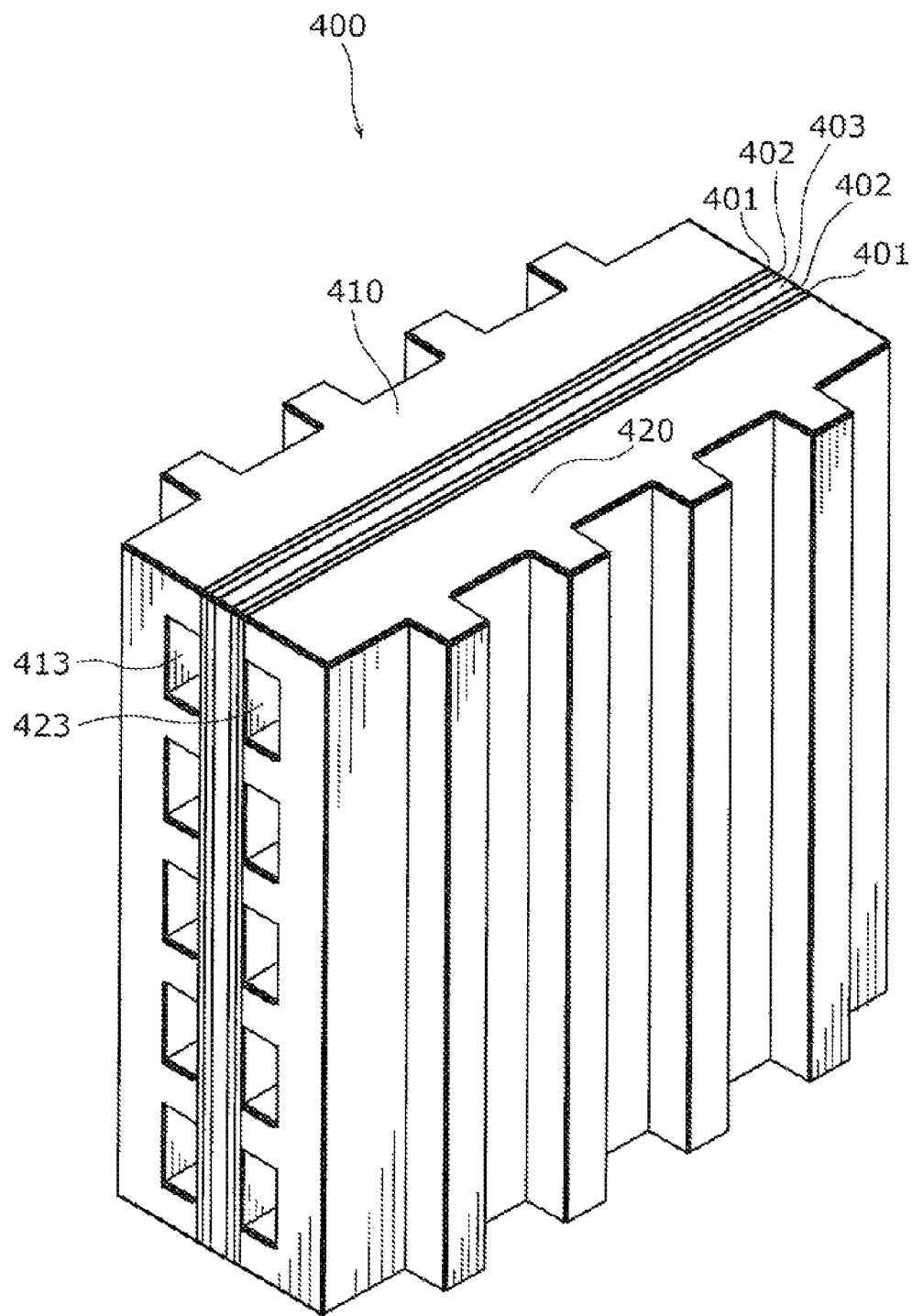
FIG. 9 is a perspective view that schematically shows a part of a cell, which is one unit of a proton-exchange membrane fuel cell.

FIG. 9 is a prospective view that schematically shows a part of a cell, which is one unit of the proton-exchange membrane fuel cell.

As shown in the same diagram, a cell 400 includes a fuel electrode side separator 410, an oxygen electrode side separator 420, the gas diffusion layer 401, the catalyst substance layer 402 and the proton conductive polymer membrane 403.

The fuel electrode side separator 410 and the oxygen electrode side separator 420 are a plate type body, which are electrically connected with an adjacent cell, and have many lines of a fluid flow path 413 and a fluid flow path 423 that circulate a fuel gas and an oxidation gas running in parallel over the entire plate body. Moreover, on a surface opposite to a surface, where the fluid flow path 413 and the fluid flow path 423 are provided, a flow path to circulate a liquid for cooling is located.

The gas diffusion layer 401 and the catalyst substance layer 402 are obtained by having fibers, which are manufactured through the fiber manufacturing apparatus and the fiber manufacturing method according to the above embodiment, is deposited in layers. The gas diffusion layer 401 is the substrate 101, and the catalyst substance layer 402 is the one that the fibers 301, which are made of a proton conductive polymer carrying the electric conductor 303 and the carried material 302 on its surface, is deposited in a nonwoven fabric cloth in the above embodiment.

The proton conductive polymer membrane 403 is a polymer resin membrane that can move a proton.

The proton-exchange membrane fuel cell is made up of a plural number of the above cells, which are stuck.

From the above, because there is a high possibility that the supplied fuel (hydrogen) makes contacts with a catalyst substance, the proton-exchange membrane fuel cell, which contains a catalyst substance layer made up of fibers according to the present invention, can divide hydrogen into a proton and an electron in a very efficient manner. Also, in a similar way, there is a high possibility that a proton, oxygen and an electron that are moved make contact with each other, it is possible that they react efficiently and water can be manufactured. Therefore, the overall proton-exchange membrane fuel cell including a catalyst substance layer according to the present invention can achieve a high power generation efficiency. Moreover, it is possible to keep the amount of the catalyst substances used to a minimum level required and reduce a cost.

Embodiment 4

Next, other embodiment regarding to the present invention is explained.

Figure 10:
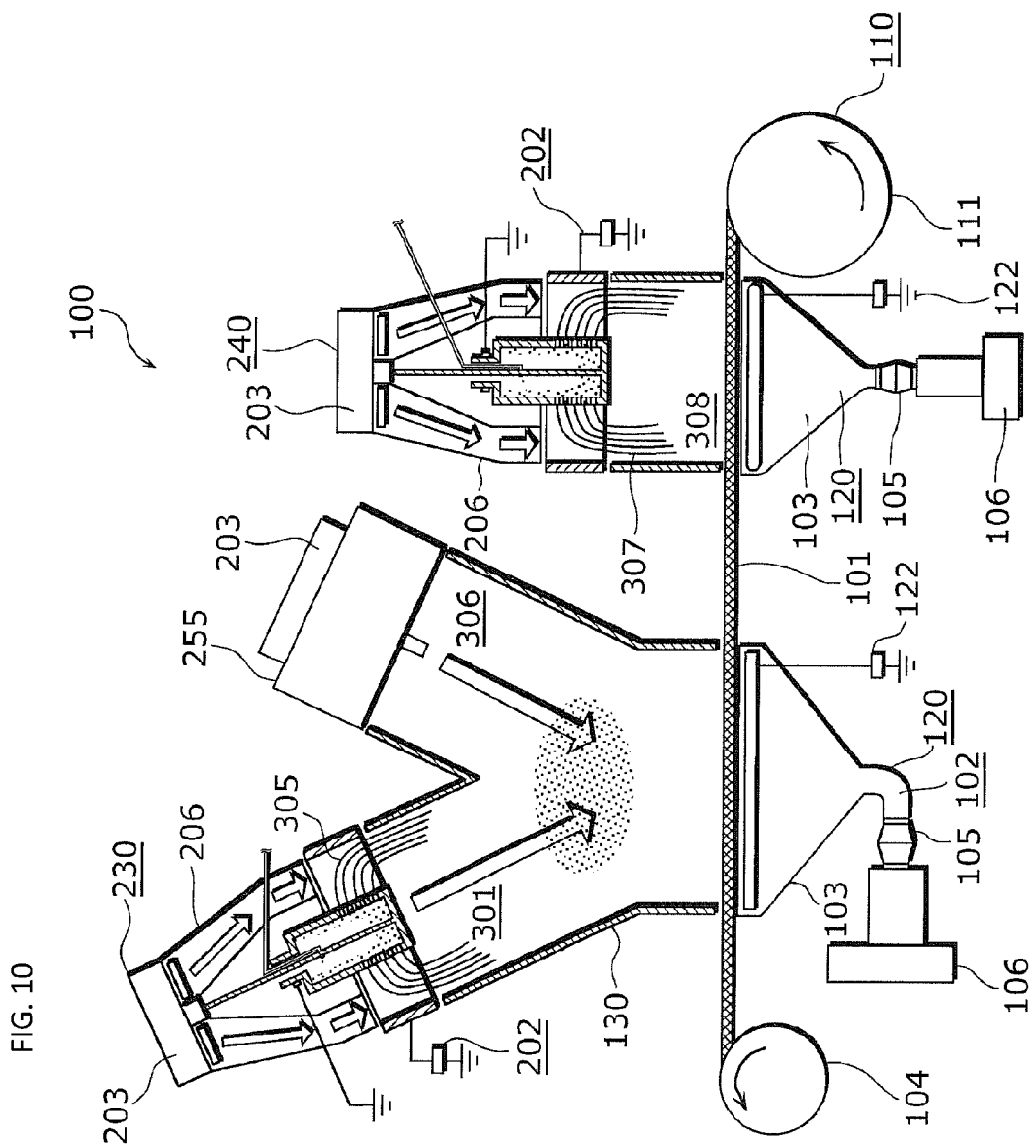
FIG. 10 is a cross-section view that schematically shows a fiber manufacturing apparatus in other embodiment according to the present invention.

FIG. 10 is a cross-section view that schematically shows a fiber manufacturing apparatus in other embodiment according to the present invention. By the way, there is a case the same indication number is assigned to a member, an apparatus and so on having the same function as those in the embodiment 3 described above, and their explanation is omitted.

As shown in the same diagram, the fiber manufacturing apparatus 100 includes the discharge apparatus 210, a fifth discharge apparatus 255, a fourth discharge apparatus 240, the mix apparatus 130 and the attractant apparatus 120. Because the discharge apparatus 210, the fourth discharge apparatus 240, the attractant apparatus 120, the collection apparatus 110 are the same as those in the embodiment 1, their explanation is omitted.

The fifth discharge apparatus 255 includes a fifth discharging apparatus, which outpours a secondary carried material 306 which the carried material 302 is carried on a surface of the electric conductor 303 into the space by using an ultrasonic sound wave or a two fluid nozzle, and a fifth electrically charging apparatus, which electrically charges the discharged secondary carried material 306 by an ionizer. The fifth discharge apparatus 255 is installed towards the mix apparatus 130, which can spray the secondary carried material 306 electrically charged in the inside of the mix apparatus 130 in a dry form.

The ionizer is an apparatus that can electrically charge a fine particle existing in the space. To be more specific, examples include any discretional methods such as a corona electrical discharge method, a superimposed voltage method, an alternating current method, a steady direct current method, a pulse direct current method, a self-discharge method, a soft x-ray method, an ultraviolet ray method, a radiation ray method and so on.

Next, a fiber manufacturing method with using the fiber manufacturing apparatus 100 in the above structure is explained, and an embodiment for the concerned fibers is applied to the catalyst substance layer for a fuel cell is explained.

At first, a gas diffusion layer is manufactured with using the fourth discharge apparatus 240.

A fourth raw material 307 is a liquid in which an electrically conductive polymer and a carbon particle are dissolved or dispersed in a solvent medium.

Then, in the same way as the discharge apparatus 210 described in the above embodiment, the fourth raw material 307 is electrically charged by using the electrically charging apparatus 202 and outpoured into the space by using outpouring apparatus 201. From the above, electrically conductive fibers 308, which are made of the electrically conductive polymer and a carbon particle, are manufactured through an electrostatic stretching phenomenon. Then, by having the concerned fibers be deposited, a nonwoven type carbon sheet having many holes is manufactured.

Then, the concerned carbon sheet is conveyed by the conveying apparatus 104 at slow speed.

Next, the fibers 301 are manufactured by using the discharge apparatus 210 in the same way as the embodiment 1.

At the same time, by using the fifth discharge apparatus 255, the secondary carried material 306, which is electrically charged with a polarity opposite to a polarity of the aforementioned fibers 301 is put into the mix apparatus 130.

From the above, the secondary carried material 306 is combined with the surface of the fibers 301.

Lastly, the fibers 301, which carry the secondary carried material 306, are attracted by the attractant apparatus 120 and are deposited on the carbon sheet manufactured in advance.

According to the above apparatus structure and method, it is possible to manufacture a gas diffusion layer and a catalyst substance layer in a series of processes, and improve a production efficiency.

In addition, in the above embodiment, the secondary carried material 306 is sprayed in a dry form. However, the present invention is not limited to this. For example, it is possible that the electric conductor 303 and the carried material 302 are sprayed separately in a dry form, have them be electrically charged with a polarity opposite to each other, manufacture the secondary carried material 306, and then mix them with the fibers 301 consisting of the proton conductive polymer.

Also, it is possible to manufacture the gas diffusion layer and the catalyst substance layer separately, and affix them to each other.

In addition, locations and combinations of the discharge apparatus 210, the third discharge apparatus 230, the secondary discharge apparatus 220, the fourth discharge apparatus 240, and the fifth discharge apparatus 255 may be freely selected as long as the catalyst substance layer is appropriately manufactured.

Moreover, the material discharge apparatus described in the embodiments according to the present invention is not limited to this. For example, it is possible that a raw material discharging apparatus is accomplished as the raw material discharging apparatus including an electrically charging apparatus, which is provided by locating a nozzle head as an outpouring unit having many outpouring holes on one wall surface of an air tunnel, of which cross-section is a rectangular, and generating an electric field and electrically charging the aforementioned material through having an electrically charging electrode on a surface facing towards the air tunnel and creating a potential difference between the aforementioned outpouring holes and the electrically charged, and also including a gas flow generation apparatus, which is provided on one side of an opening end of the air tunnel. Also, the discharge apparatus may be provided by using an electric field fiber spinning unit that discharges a raw material from a tip of one nozzle and impresses an electric field.

The present invention can be used for manufacturing fibers or a nonwoven fabric cloth having a function such as photocatalyst or deodorizing effects.

In addition, it can be used for manufacturing a fuel cell.

The invention claimed is:

1. A fiber manufacturing method comprising:
a first outpouring step of outpouring a first raw material as a material of fibers into a space;
a first electrically charging step of applying an electric charge to the first raw material and making the first raw material electrically charged;
a fiber manufacturing step of manufacturing fibers made of the electrically charged and outpoured first raw material by having said first raw material stretch;
a secondary electrically charging step of electrically charging a secondary raw material including a carried material to be carried on the fibers with a polarity opposite to a polarity of the electrically charged fibers; and
a mixing step of mixing the manufactured fibers and the electrically charged carried material in the space.

2. The fiber manufacturing method according to claim 1, further comprising
a conveying step of conveying the manufactured fibers by a gas flow,
wherein, in said mixing step, the fibers in said conveying step and the carried material are mixed.

3. The fiber manufacturing method according to claim 2, further comprising
a collection step of separating the fibers carrying the carried material from the gas flow, and depositing and collecting the fibers.

4. The fiber manufacturing method according to claim 1,
wherein the first raw material includes a proton conductive polymer and a volatile solvent medium,
the secondary raw material includes a catalyst substance as a carried material, and
in said fiber manufacturing step, fibers made of the proton conductive polymer are manufactured, and
the fiber manufacturing method further comprises:
a third electrically charging step of applying an electric charge to a third raw material including an electric conductor and making the third raw material electrically charged;
a third outpouring step of outpouring the third raw material into a space;
a mixing step of mixing the fibers, the catalyst substance and the electric conductor in the space; and
a deposit step of depositing the fibers, the electric conductor and the catalyst substance on a substrate.

5. The fiber manufacturing method according to claim 4,
wherein, in said secondary electrically charging step and said third electrically charging step, a polarity of an electric charge applied to the catalyst substance and a polarity of an electric charge applied to the electric conductor are adjusted to be different from each other, and
in said mixing step, a carried material including a combination of the electric conductor and the catalyst substance is formed by mixing the catalyst substance and the electric conductor, and
the fibers and the carried material are combined by mixing the fibers and a carried substance.

6. The fiber manufacturing method according to claim 5, wherein, in said first electrically charging step, said third electrically charging step and said secondary electrically charging step, an amount of the electric charge and a polarity applied to the first raw material, the secondary raw material and the third raw material are adjusted to electrically charge the formed carried material with a polarity opposite to a polarity of an electric charge applied to the fibers in said mixing step.

7. The fiber manufacturing method according to claim 4, comprising:
- a fourth electrically charging step of applying an electric charge to a fourth raw material including a proton conductive polymer or an electric conductor and a volatile solvent medium, and making the fourth raw material electrically charged;
- a fourth outpouring step of outpouring the fourth raw material into a space; and
- a substrate manufacturing step of manufacturing a substrate by depositing fibers made of a proton conductive polymer or an electric conductor, which are manufactured by having the fourth raw material stretch.

8. A fiber manufacturing apparatus comprising:
- a first outpouring apparatus configured to outpour a first raw material as a material of fibers into a space;
- an electrically charging apparatus configured to apply an electric charge to the first raw material and make the first raw material electrically charged;
- a first gas flow generation apparatus configured to generate a gas flow for conveying the fibers;
- a secondary electrically charging apparatus configured to electrically charge a secondary raw material including a carried material to be carried on the fibers with a polarity opposite to a polarity of the fibers electrically charged; and
- a mixing apparatus configured to mix the manufactured fibers and the electrically charged carried material.

9. The fiber manufacturing apparatus according to claim 8, further comprising
a collection apparatus configured to separate the fibers carrying the carried material from the gas flow, deposit and collect the fibers.

10. The fiber manufacturing apparatus according to claim 8, further comprising:
- a secondary outpouring apparatus configured to outpour a secondary raw material into a space; and
- a secondary gas flow generation apparatus configured to generate a gas flow for conveying the carried material, and
wherein the secondary electrically charging apparatus applies an electric charge to the secondary raw material and makes the secondary raw material electrically charged.

11. The fiber manufacturing apparatus according to claim 8,
wherein the first raw material includes a proton conductive polymer and a volatile solvent medium, and
the secondary raw material includes a catalyst substance as a carried material, and
the fiber manufacturing apparatus further comprises:
- a third electrically charging apparatus configured to apply an electric charge to a third raw material including an electric conductor and make the third raw material electrically charged;
- a third outpouring apparatus configured to outpour the third raw material into a space;
- a first gas flow generation apparatus configured to generate a gas flow for conveying the first raw material, the electric conductor and the catalyst substance; and
- a mixing apparatus configured to mix the proton conductive polymer, the electric conductor and the catalyst substance.

12. A catalyst substance layer manufacturing method for manufacturing a catalyst substance layer for a fuel cell, comprising:
- a first electrically charging step of applying an electric charge to a first raw material including a proton conductive polymer and a volatile solvent medium and making the first raw material electrically charged;
- a first outpouring step of outpouring the first raw material into a space;
- a fiber manufacturing step of manufacturing fibers made of the proton conductive polymer by having the first raw material stretch;
- a second electrically charging step of applying an electric charge to a second raw material including a carried material of which electric conductor and catalyst substance are combined and making the second raw material electrically charged;
- a second outpouring step of outpouring the second raw material into a space;
- a mixing step of mixing the fibers and the carried material in the space; and
- a deposit step of depositing the fibers and the carried material on a substrate.

* * * * *